US011021082B2

United States Patent
Ahn et al.

(10) Patent No.: US 11,021,082 B2
(45) Date of Patent: Jun. 1, 2021

(54) SECOND ROW PRIORITY SEATING FOR VEHICLES

(71) Applicant: Waymo LLC, Mountain View, CA (US)

(72) Inventors: YooJung Ahn, Mountain View, CA (US); David Tse-Zhou Lu, Menlo Park, CA (US); Min Li Chan, San Francisco, CA (US); Brian Douglas Cullinane, Palo Alto, CA (US); Adam Lee Frost, San Jose, CA (US); Philippe Robert Agostino Holland, Royan (FR); Hassan Rashid Mir, Mainz (DE); Marcos Aniceto Villalón Caro, London (GB); Isaac Lopes Nogueras, Badalona (ES)

(73) Assignee: Waymo LLC, Mountain View, CA (US)

( * ) Notice: Subject to any disclaimer, the term of this patent is extended or adjusted under 35 U.S.C. 154(b) by 127 days.

(21) Appl. No.: 16/538,176

(22) Filed: Aug. 12, 2019

(65) Prior Publication Data
US 2020/0009991 A1 Jan. 9, 2020

Related U.S. Application Data

(63) Continuation of application No. 15/820,577, filed on Nov. 22, 2017, now Pat. No. 10,442,316, which is a
(Continued)

(51) Int. Cl.
*B60N 2/01* (2006.01)
*B60N 2/874* (2018.01)
(Continued)

(52) U.S. Cl.
CPC ............... *B60N 2/01* (2013.01); *B60N 2/206* (2013.01); *B60N 2/2222* (2013.01);
(Continued)

(58) Field of Classification Search
CPC . B60N 2/01; B60N 2/874; B60N 2/91; B60N 2/206; B60N 2/2222; B60N 2/3011;
(Continued)

(56) References Cited

U.S. PATENT DOCUMENTS 5,492,386 A  2/1996 Callum
6,113,172 A  9/2000 Chaloult et al.
(Continued)

FOREIGN PATENT DOCUMENTS

CN  102917916 A  2/2013
CN  104859648 A  8/2015
(Continued)

OTHER PUBLICATIONS

Chinese Office Action for Application No. 201780030020.5 dated Jul. 15, 2019.
(Continued)

*Primary Examiner* — Lori L Lyjak
(74) *Attorney, Agent, or Firm* — Botos Churchill IP Law

(57) ABSTRACT

Aspects of the disclosure relate to vehicles capable of autonomous driving. These vehicles may include seats for accommodating different numbers of passengers. In some cases, the seats may be reconfigurable. For instance, a vehicle may include a first row of seating having a first, passenger use configuration. The first row may allow a passenger to sit in a seat of the first row of seating and access user input controls for the vehicle. The first row of seating may also have a second, folded configuration where the first row is in a folded configuration and no longer usable for passenger seating. The vehicle may also have a second row
(Continued)

of seating. When the first row of seating is in the second, folded configuration, the second row of seating may still be usable for seating and may include additional legroom for the passenger as compared to when the first row of seating is in the first passenger use configuration.

20 Claims, 33 Drawing Sheets

Related U.S. Application Data continuation of application No. 15/158,984, filed on May 19, 2016, now Pat. No. 9,855,860.

(51) Int. Cl.
*B60N 3/06* (2006.01)
*B60R 7/04* (2006.01)
*B60N 2/90* (2018.01)
*B60N 2/20* (2006.01)
*B60N 2/22* (2006.01)
*B60N 2/30* (2006.01)
*B60R 11/00* (2006.01)

(52) U.S. Cl.
CPC .......... *B60N 2/3011* (2013.01); *B60N 2/3065* (2013.01); *B60N 2/874* (2018.02); *B60N 2/91* (2018.02); *B60N 3/06* (2013.01); *B60R 7/04* (2013.01); *B60R 2011/0007* (2013.01)

(58) Field of Classification Search
CPC .......... B60N 2/3065; B60N 3/06; B60R 7/04; B60R 2011/0007
See application file for complete search history.

(56) References Cited

U.S. PATENT DOCUMENTS

| | | | |
|---|---|---|---|
| 6,971,699 | B2 | 12/2005 | Isaacson |
| 8,888,189 | B2 | 11/2014 | Tamura et al. |
| 9,199,553 | B2 | 12/2015 | Cuddihy et al. |
| D755,531 | S | 5/2016 | Ahn et al. |
| D764,386 | S | 8/2016 | Ahn et al. |
| D770,349 | S | 11/2016 | Ahn et al. |
| 9,855,860 | B2 | 1/2018 | Ahn et al. |
| 2001/0050502 | A1 | 12/2001 | Fourrey et al. |
| 2003/0184112 | A1 | 10/2003 | Furui |
| 2003/0234550 | A1 | 12/2003 | Brooks et al. |
| 2004/0160081 | A1 | 8/2004 | Horsford et al. |
| 2004/0251728 | A1 | 12/2004 | Braitmaier et al. |
| 2006/0152025 | A1* | 7/2006 | Tomasson ................ B60N 2/01 296/24.3 |
| 2006/0181105 | A1 | 8/2006 | Puschmann |
| 2007/0158979 | A1 | 7/2007 | Saberan et al. |
| 2008/0203772 | A1 | 8/2008 | Holdampf |
| 2008/0284214 | A1 | 11/2008 | Neale |
| 2010/0052388 | A1 | 3/2010 | Holdampf |
| 2012/0313394 | A1 | 12/2012 | Barrow et al. |
| 2013/0057042 | A1 | 3/2013 | Kortwig et al. |
| 2013/0062903 | A1* | 3/2013 | Mather ................ B60N 2/3031 296/64 |
| 2015/0142273 | A1 | 5/2015 | Cuddihy et al. |
| 2015/0183345 | A1 | 7/2015 | Ketels et al. |
| 2015/0251566 | A1 | 9/2015 | Cuddihy et al. |
| 2015/0298812 | A1 | 10/2015 | Jasny et al. |
| 2015/0331236 | A1 | 11/2015 | Roth et al. |
| 2015/0338849 | A1 | 11/2015 | Nemec et al. |
| 2016/0277513 | A1 | 9/2016 | Kim et al. |
| 2016/0318422 | A1 | 11/2016 | Thomas et al. |
| 2017/0054842 | A1 | 2/2017 | Choi |
| 2018/0118052 | A1 | 5/2018 | Ahn et al. |

FOREIGN PATENT DOCUMENTS

| | | |
|---|---|---|
| EP | 1040960 A1 | 10/2000 |
| EP | 2565074A1 A1 | 6/2013 |
| JP | H10203224 A | 8/1998 |
| JP | 2003118463 A | 4/2003 |
| JP | 2003205776 A | 7/2003 |
| JP | 2003226176 A | 8/2003 |
| JP | 2004098724 A | 4/2004 |
| JP | 5516725 B2 | 4/2010 |
| JP | 2012240622 A | 12/2012 |
| WO | 2011135651 A1 | 11/2011 |
| WO | 2014012438 A1 | 1/2014 |

OTHER PUBLICATIONS

"International Search Report and Written Opinion received for PCT Patent Application No. PCT/US2017/032640, dated Aug. 10, 2017", 15 pages.
"Yanfeng Automotive Interiors", Available online at: <http://www.yfai.com/yanfeng-automotive-interiors-reveals-xim-autonomous-vehicle-interior-2017-north-american>, 2017.
Automotive News , "Ford Patents Autonomous Vehicle With "reconfigurable seats"", Available online at: <http://www.autonews.com/article/20150820/OEM06/150829990/ford-patents-autonomous-vehide-with-reconfigurable-seats>, 2015.
Dezeen Magazine , "Volvo Unveils Luxury Car Interior Concept for Chauffeur-Driven Executives", Available online at: <<http://www.dezeen.com/2015/04/20/volvo-lounge-control-car-interior/>, 2015.
The Verge , "Ford will build an autonomous car without a steering wheel or pedals by 2021", Available online at: <https://www.theverge.com/2016/8/16/12504300fford-autonomous-car-ride-sharing-2021>, Aug. 16, 2016.
Whale, G. R , "Trax is Chevy's Smallest Cute-ute Ever", Available online at: <<http://www.vcstar.com/cars/trax-is-chevys-smallest-smallest-cute-ute-ever-ep-1161842388-340937131.html>, 2015.
Wired , "In 20 Years, Most New Cars Won't Have Steering Wheels or Pedals", 2014, 7 pages.
Chinese Office Action for Application No. CN201780030020.5 dated Oct. 30, 2019.
Japanese Office Action for Application No. 2018-558382 dated Oct. 28, 2019.
Japanese Decision to Grant for Application No. 2018-558382 dated Mar. 16, 2020.
Republic of Korea Notice of Preliminary Rejection for Application No. 10-2018-7036418 dated Mar. 23, 2020.
Extended European Search Report for Application No. 17799942.2 dated Jan. 2, 2020.

* cited by examiner

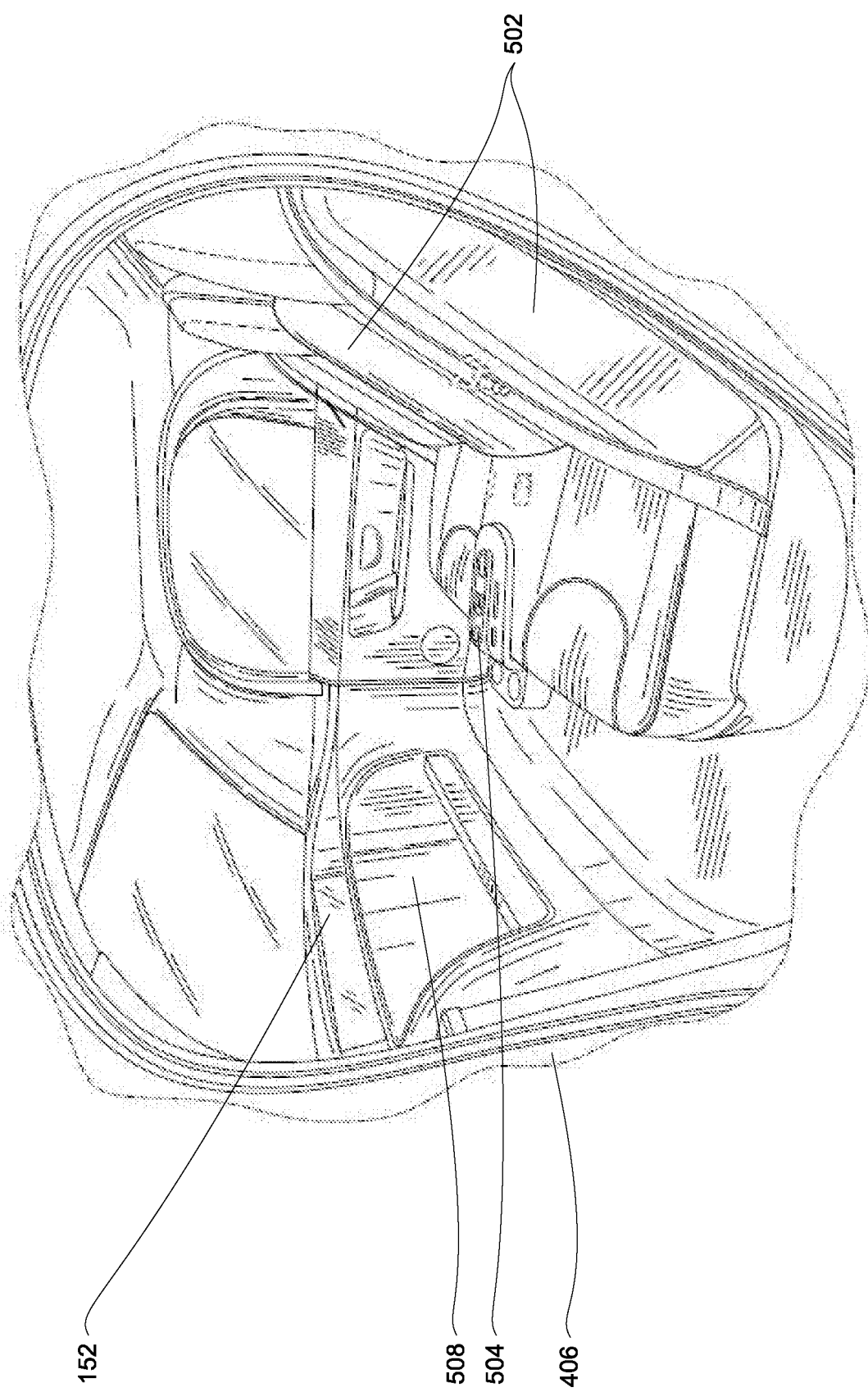

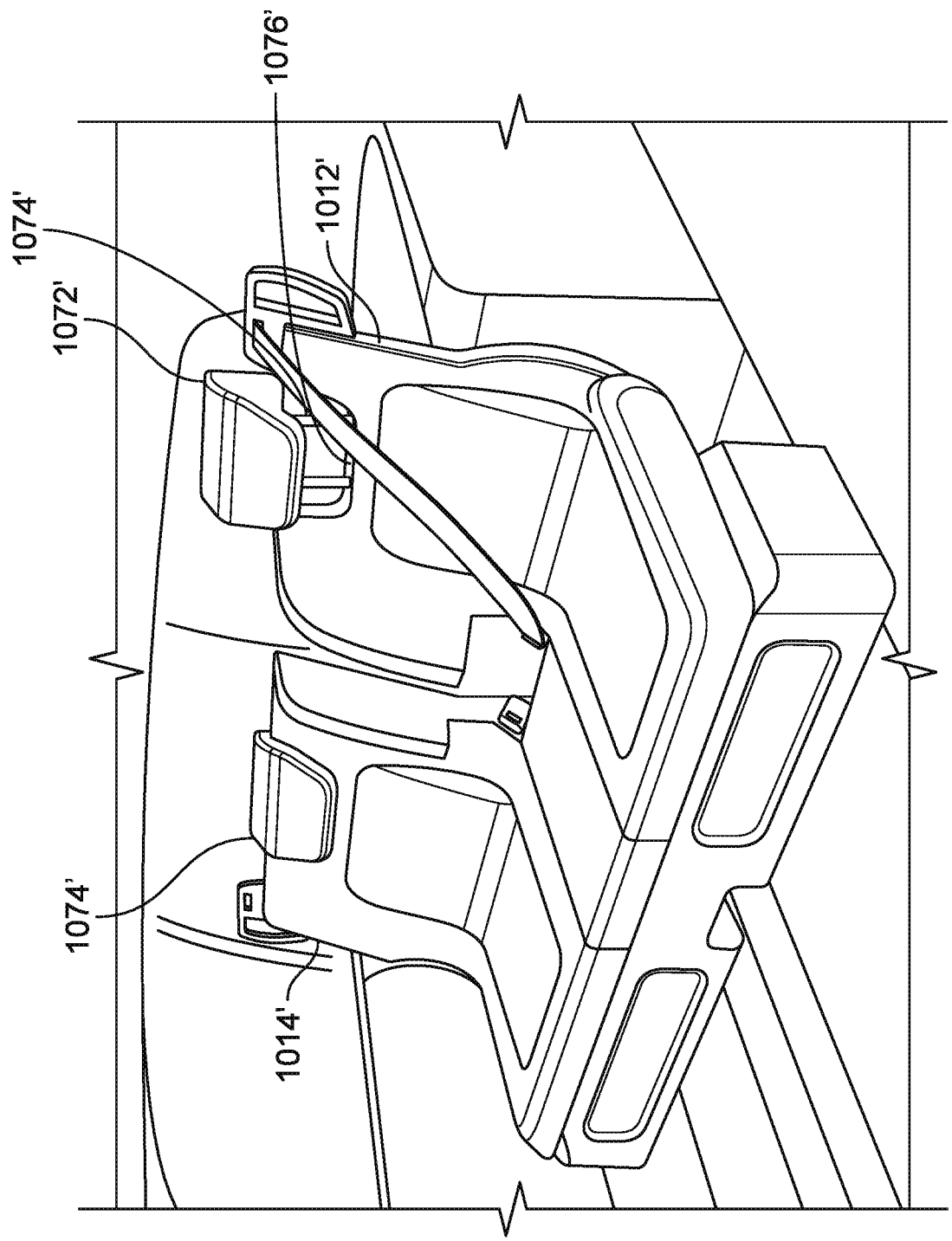

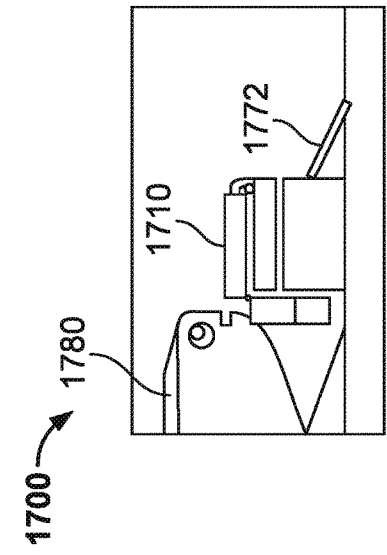
FIGURE 17B
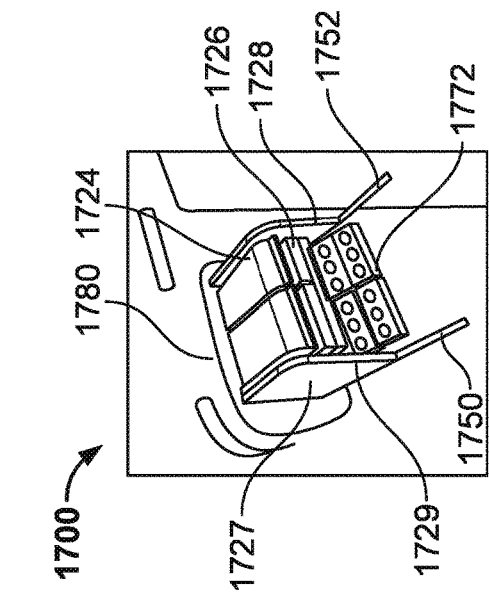
FIGURE 17D
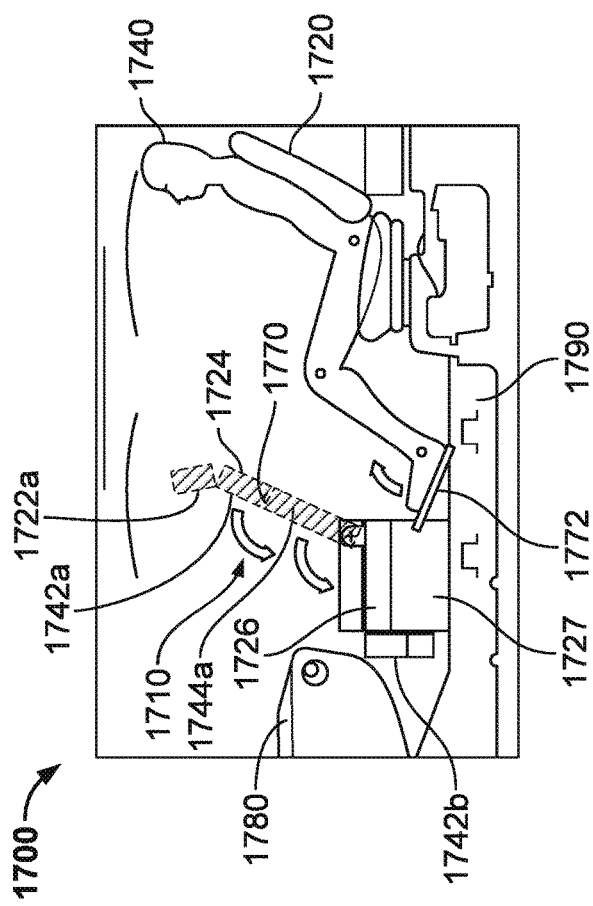
FIGURE 17A
FIGURE 17C

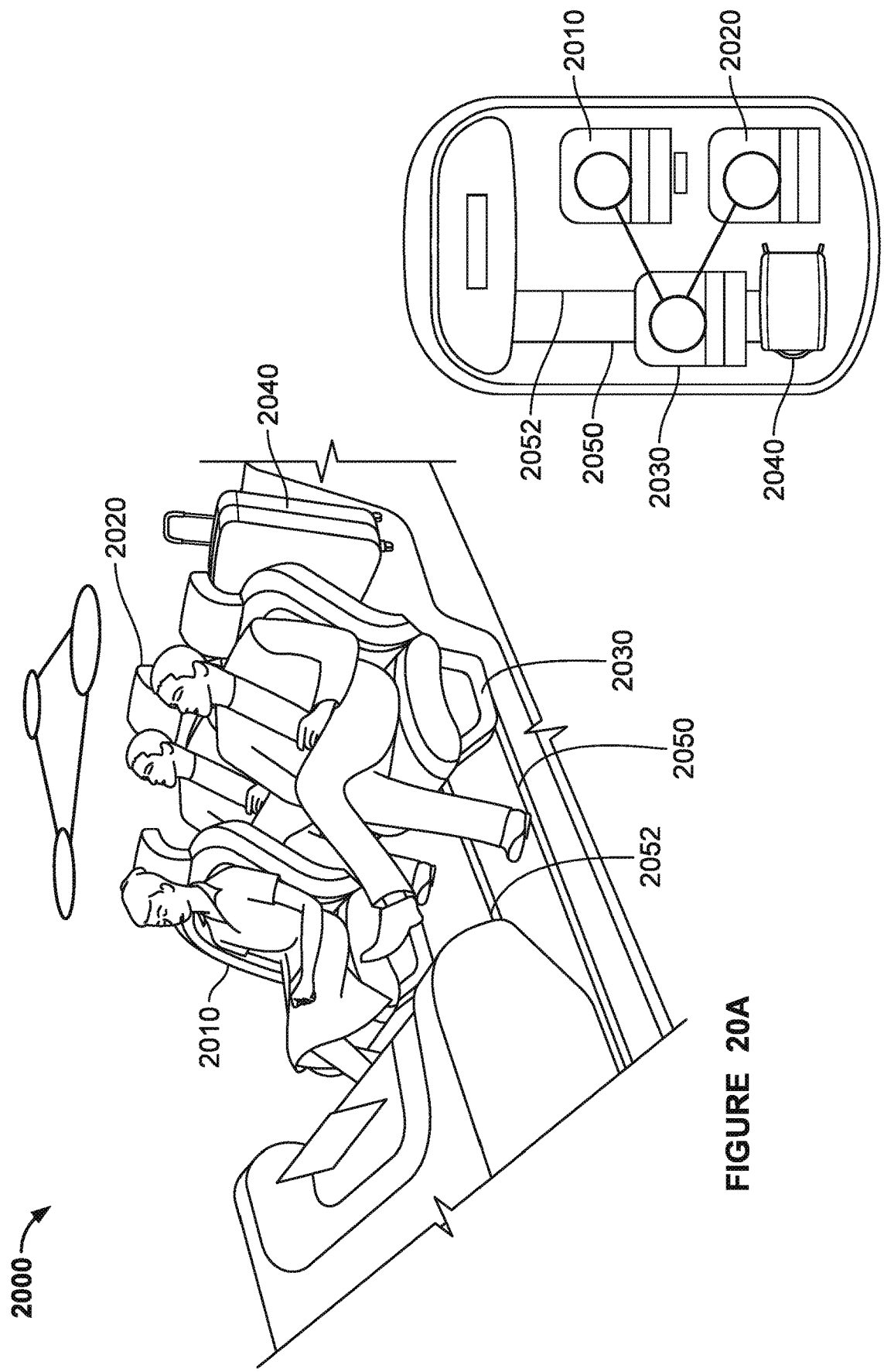

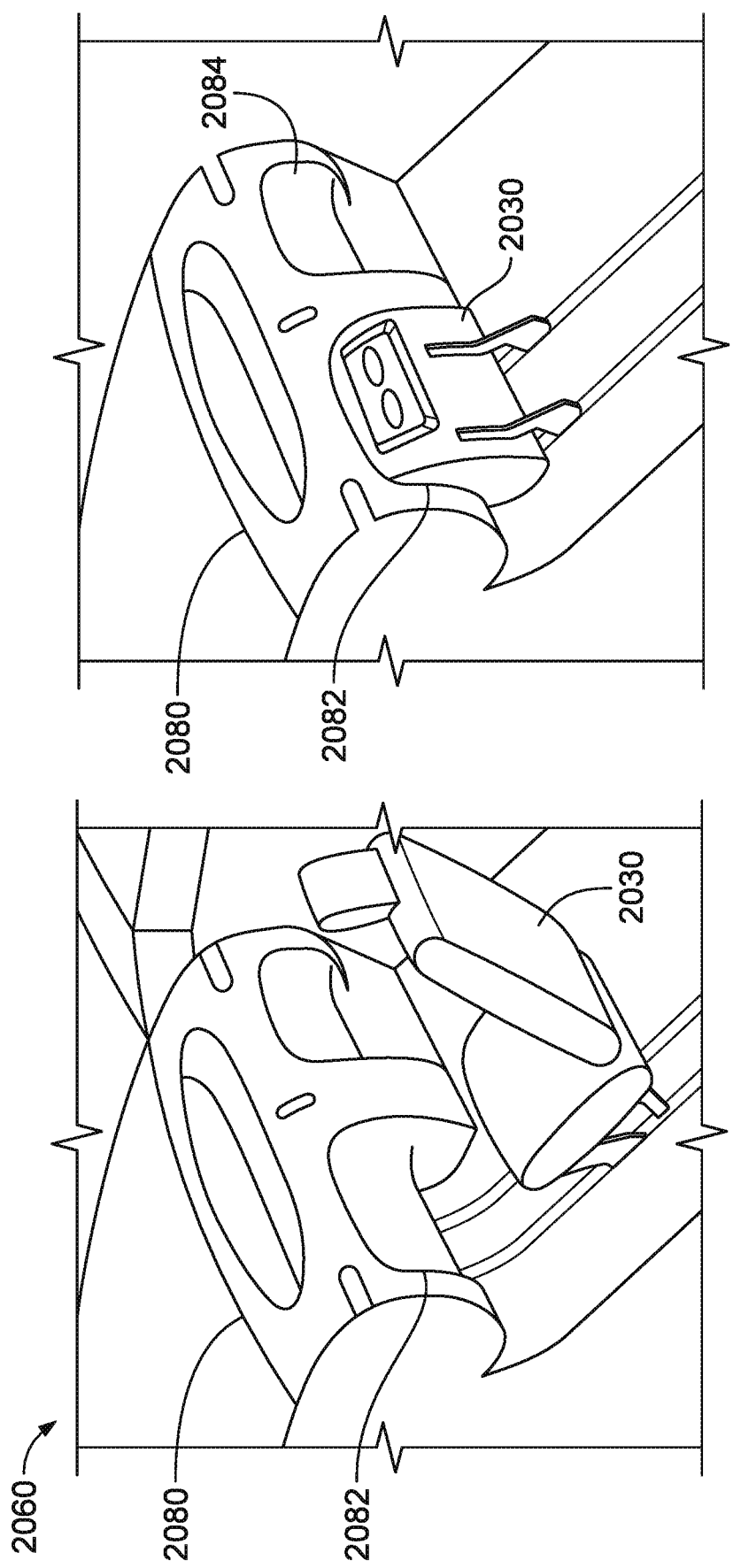

SECOND ROW PRIORITY SEATING FOR VEHICLES

CROSS-REFERENCE TO RELATED APPLICATIONS

The present application is a continuation of U.S. patent application Ser. No. 15/820,577, filed Nov. 22, 2017, which is a continuation of U.S. patent application Ser. No. 15/158,984 filed May 19, 2016, now issued as U.S. Pat. No. 9,855,860 on Jan. 2, 2018, the disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

BRIEF SUMMARY

One aspect of the disclosure provides a vehicle. The vehicle includes a first row of seating having a first, passenger use configuration where the first row allows a passenger to sit in a seat of the first row of seating and access user input controls for the vehicle. The first row of seating also has a second, folded configuration where the first row is in a folded, configuration no longer usable for passenger seating. The vehicle also includes a second row of seating. When the first row of seating is in the second, folded configuration, the second row of seating is usable for seating and includes additional legroom for the passenger as compared to when the first row of seating is in the first passenger use configuration.

In one example, the vehicle also includes a computing system configured to control a vehicle autonomously without continuous input from the passenger. In another example, the vehicle also includes a dashboard including a recess that allows the seat to fold into the dashboard when the first row of seating is in the second, folded configuration such that the seat becomes integral with the dashboard. In another example, the vehicle also includes manual controls for steering, braking and acceleration. In this example, the vehicle also includes a partition configured to prevent the passenger from reaching the manual controls when the first row of seating is in the second, folded configuration. In addition, the partition includes a first top portion configured to pivot about a second base portion in order to prevent the passenger from reaching the manual controls when the first row of seating is in the second, folded configuration. In addition, the second base portion is configured to move within the vehicle in order to change the position of the partition relative to the first row of seating.

In another example, the vehicle does not include a steering wheel. In another example, the first row of seating includes a hinge line though a seat back portion of the seat configured to support a back of the passenger, and the hinge line allows the seat back portion of the seat to fold at the hinge line. In this example, when the first row of seating is in the second, folded configuration, the seat is folded at the hinge line. In addition or alternatively, passenger use configuration, the hinge line is configured to allow the seat back to fold towards the second row of seating. In addition or alternatively, the seat further includes a headrest, and when the first row of seating is in the first, passenger use configuration, the headrest is configured to fold away from the second row of seating in order to transition the first row of seating to the second, folded configuration.

In another example, the vehicle also includes a dashboard including a recess that allows at least a portion of the seat to fit into the dashboard when the first row of seating is in the second, folded configuration. In another example, the at least a portion of the seat includes a headrest of the seat. In another example, the vehicle also includes a set of tracks, and the first row is configured to move along the set of tracks in order to transition between the first, passenger use configuration and the second, folded configuration. In another example, the vehicle also includes a recess in a floor of the vehicle. The recess is sized to accept the folded first row of seating such that a back surface of the seat is flush with the floor when the first row of seating is in the second, folded configuration. In another example, the vehicle also includes a pop-up foot rest. The popup foot rest is configured to move away from a floor of the vehicle and into a passenger use configuration when the first row of seating is moved from the first, passenger use configuration to the second, folded configuration. In another example, the popup foot rest is configured to move towards a floor of the vehicle into a folded configuration when the first row of seating is moved from the second, folded configuration to the first, passenger use configuration. In another example, the vehicle also includes a console having user input buttons. The console is configured to move into different positions such that a first position allows the passenger when in the second row of seating to readily access the user input buttons when the first row of seating is in the first, passenger use configuration. In another example, the console is configured to move along a set of tracks into the different positions.

BRIEF DESCRIPTION OF THE DRAWINGS

FIG. 5 is an example internal view of a vehicle in accordance with aspects of the disclosure.

FIGS. 6-10A are example interview views of vehicles in accordance with aspects of the disclosure.

FIGS. 10B-10G are examples of vehicle seats and headrest configurations in accordance with aspects of the disclosure.

FIGS. 17A-17F are examples of folding seat configurations in accordance with aspects of the disclosure.

FIGS. 18A-20F are example interview views of vehicles in accordance with aspects of the disclosure.

DETAILED DESCRIPTION

Overview

Seating

Figure 1:
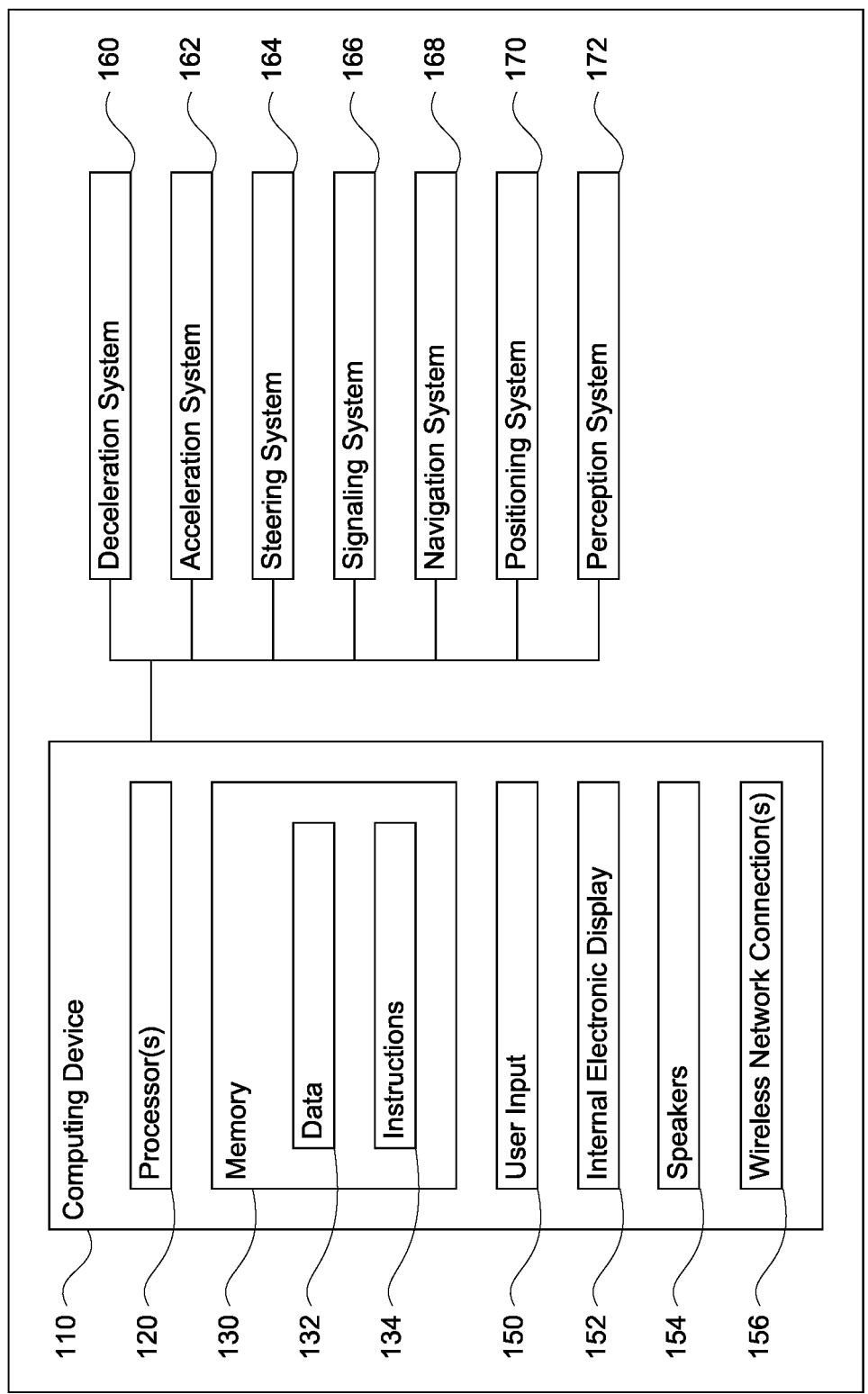
FIG. 1 is a functional diagram of an example vehicle in accordance with an exemplary embodiment.

The technology relates to seating configurations for vehicles, such as autonomous vehicles that do not need constant inputs from a human driver. As an example, the interior of the vehicle may be configured to adapt to the needs of the passengers who are currently (or who will next be) using the autonomous vehicle. These vehicles may include one or more rows of seats for one or more passengers. These rows may have a first, passenger use configurations to allow one or more passengers to sit and ride in the row as well as a second, folded configuration. In the folded configuration, the row may no longer usable for passengers (i.e. there is not enough room for a passenger to safely sit and ride in the vehicle.

In order to change from the first, passenger use configuration to the second configuration, the seats may be folded and slid along a set of tracks. Various folding techniques may be used as discussed below. In addition, the dashboard and/or floor of the vehicle may be configured to facilitate the folding in order to allow passengers in an adjacent row additional leg room or room for luggage, etc. In some examples, the floor of the vehicle may include a pop-up footrest that pops up when a row of seats is moved to the second, folded configuration and is stowed when the row of seats is moved to the first, passenger use configuration.

Alternatively, the second, folded configuration may be a stacked configuration. For example, rather than folding the first row to achieve the second configuration, the first row is "stacked" onto the second row by moving the first row back over the second row.

In order for a user to provide input to the vehicle, as noted above, the vehicle may include a console arranged for use by a priority passenger. A passenger may be a passenger who is responsible for controlling aspects of the autonomous vehicle and thus needs to be able to readily access user inputs of the console. As noted above, the configuration of the rows of a vehicle may be changed. By doing so, the position of the passengers may also change, including the priority passenger who may need access to the console. Because of this, when the seating configurations are changed, the console may also be moved within the vehicle. For instance, the console may be incorporated into a housing. This housing may be movable within the interior of the car. For instance, the housing may be moved towards a front end or a rear end of the vehicle depending upon the location of the priority row, or rather the row having the priority passenger, is expected to be located. In this regard, once the rows of seats have been configured, the console may also be moved within the vehicle corresponding to the current configuration of the rows and placement of the priority passenger.

Although the autonomous vehicle may be fully capable of full-time autonomous driving, manual controls (steering, braking, acceleration, signaling, etc.) are often legally required to exist in autonomous vehicles. Such controls are especially important to allow a designated test passenger to take control of the vehicle in an emergency situation. As an example, a test passenger may be a human operator or "test driver" tasked with testing the vehicle by sitting in the vehicle and observing the vehicle's actions when the vehicle is operating autonomously. However, in many situations, having manual controls when the vehicle does not include a designated test passenger, may introduce a safety risk to passengers and bystanders should a passenger interfere with the manual controls. In order to address these risks, it may be appropriate to include a partition. This may reduce the likelihood of a passenger interfering with the manual controls.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
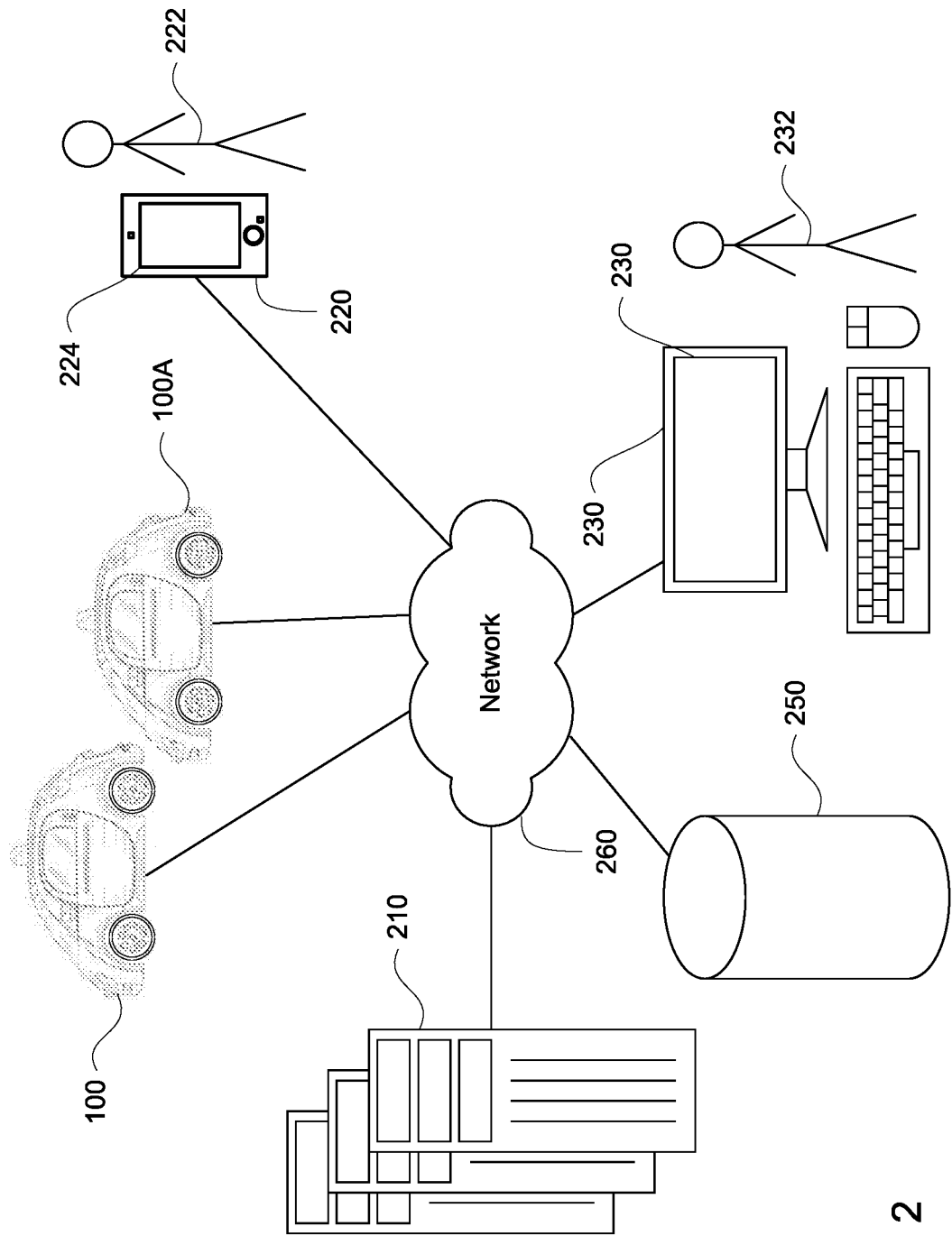
FIG. 2 is a functional diagram of an example system in accordance with an exemplary embodiment.
Figure 3:
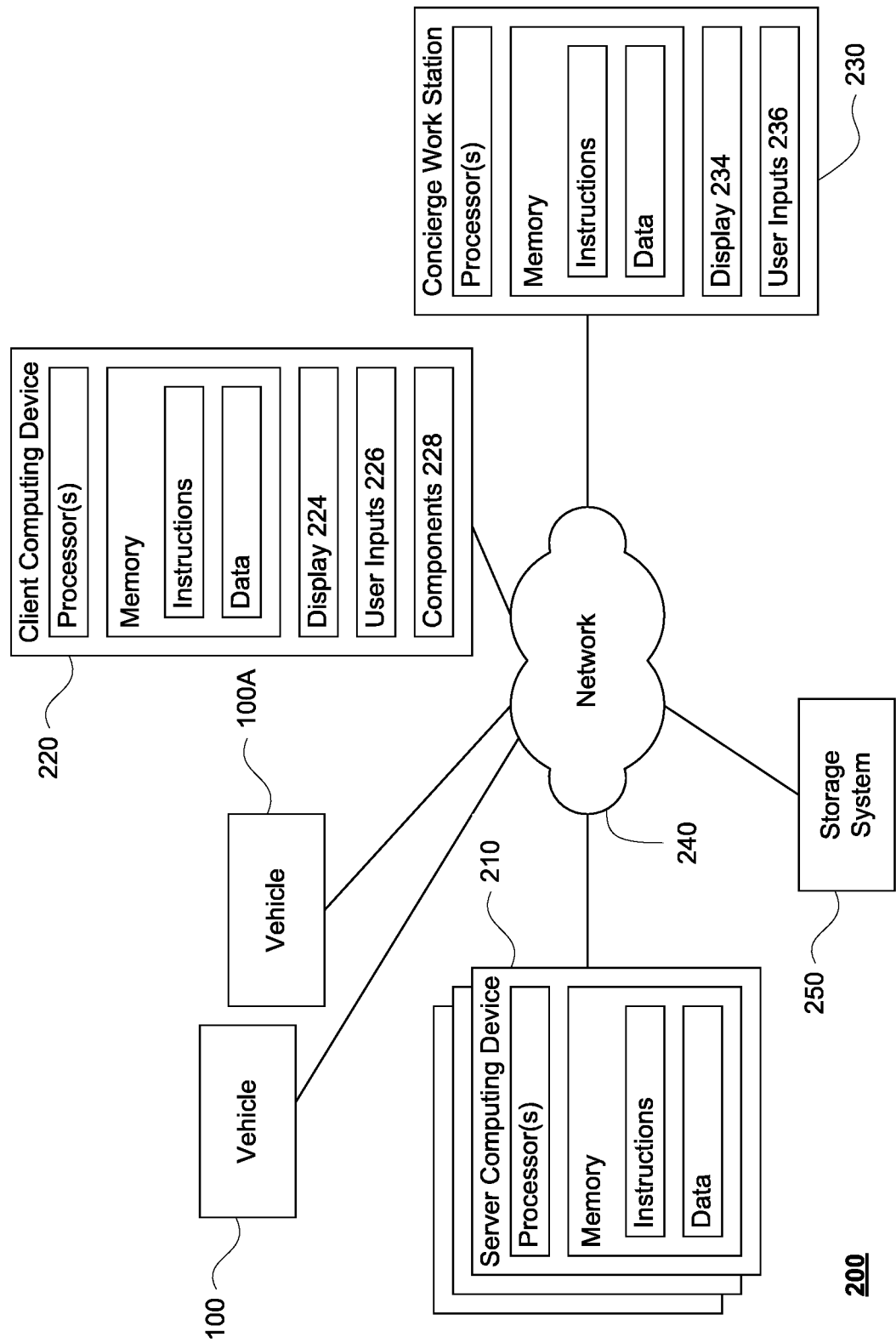
FIG. 3 is a pictorial diagram of the system of FIG. 2 in accordance with aspects of the disclosure.
Figure 4A:
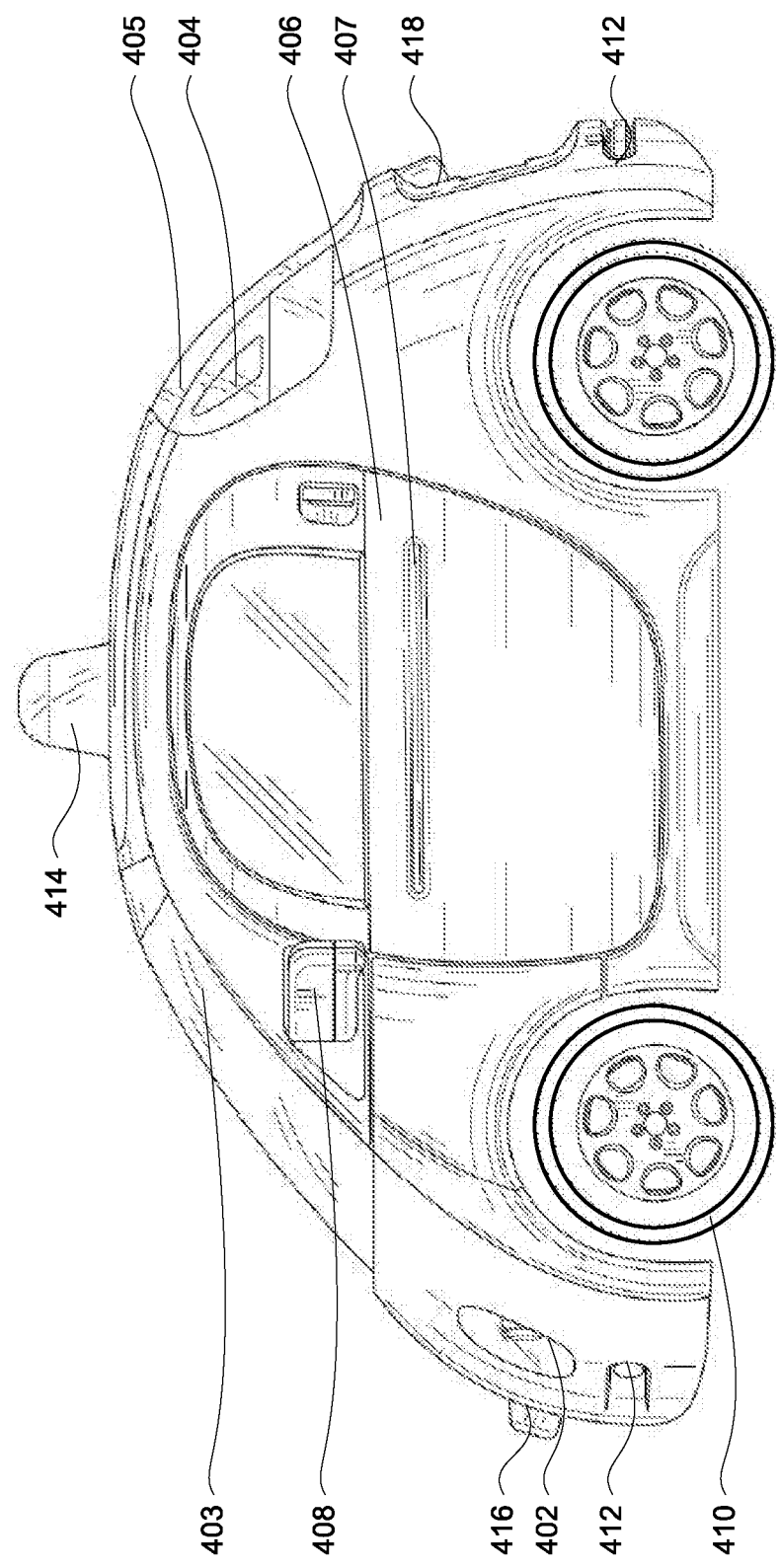
FIGS. 4A-4D are example external views of a vehicle in accordance with aspects of the disclosure.
Figures 4B, 4C:
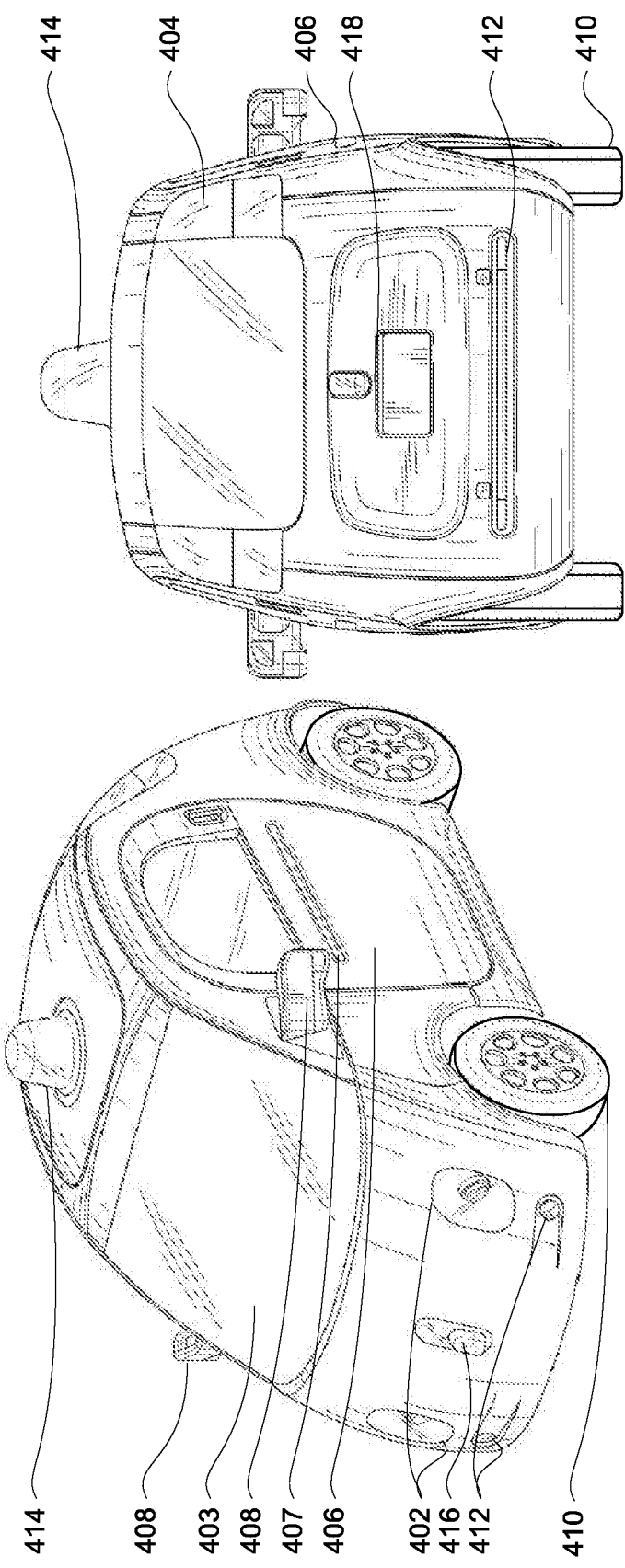
Figure 4D:
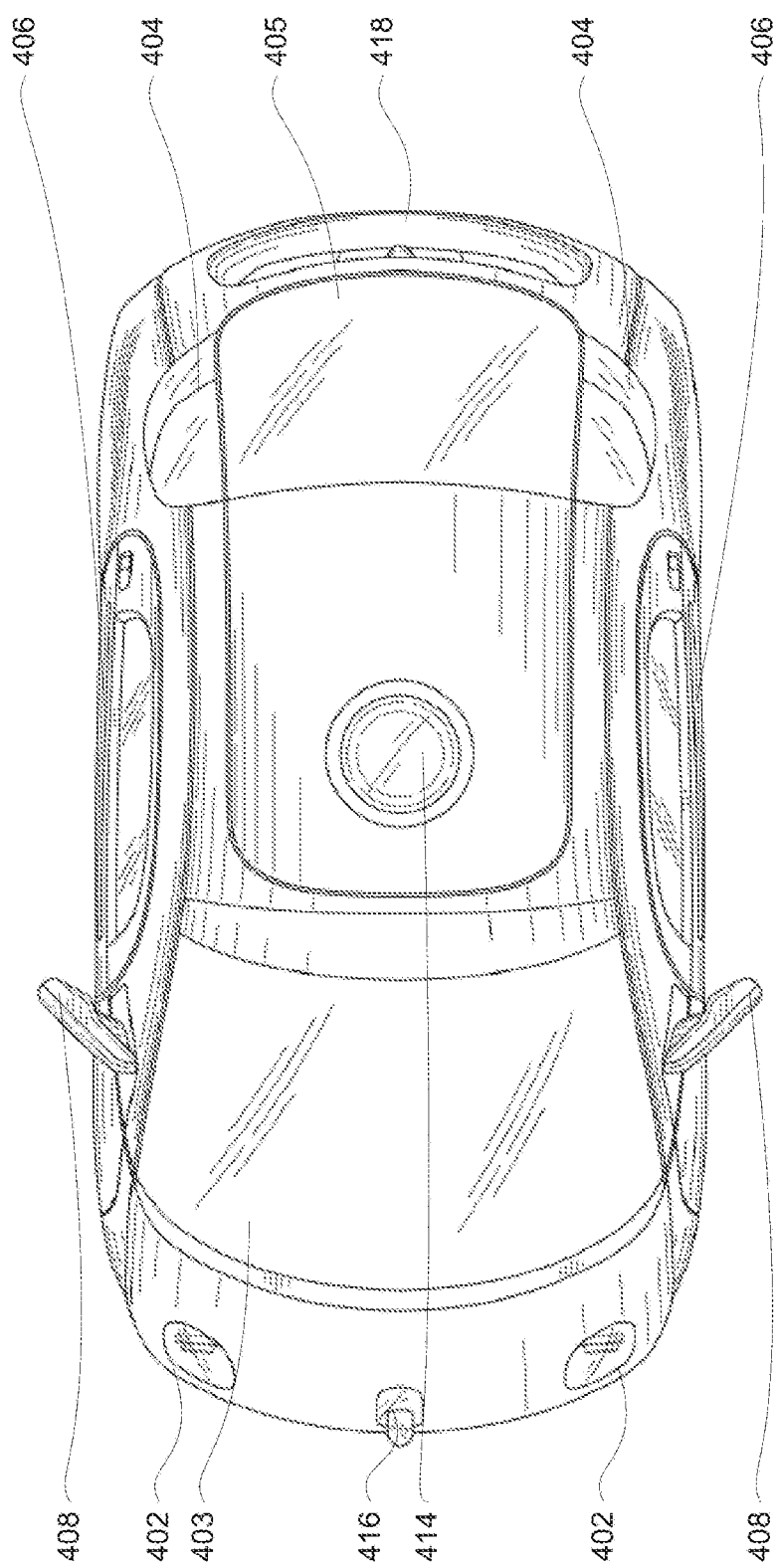

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232 on a display, such as displays 224, 234 of computing devices 220, 230. In this regard, computing devices 220, 230 may be considered client computing devices.

As shown in FIG. 3, each client computing device 220, 230, may be a personal computing device intended for use by a user 222, 232, and have all of the components normally used in connection with a personal computing device including a one or more processors (e.g., a central processing unit (CPU)), memory (e.g., RAM and internal hard drives) storing data and instructions, a display such as displays 224, 234 (e.g., a monitor having a screen, a touch-screen, a projector, a television, or other device that is operable to display information), and user input devices 226, 236 (e.g., a mouse, keyboard, touch-screen or microphone). The client computing devices may also include a camera for recording video streams, speakers, a network interface device, and all of the components used for connecting these elements to one another.

In addition, the client computing device 220 may also include components 228 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. As an example the user may input information using a small keyboard, a keypad, microphone, using visual signals with a camera, or a touch screen.

In some examples, client computing device 230 may be a concierge work station used by an administrator or customer support representative (concierge) to provide concierge services to users such as user 222. For example, a concierge 232 may use the concierge work station 230 to communicate via a telephone call or audio connection with users through their respective client computing devices or vehicles 100 or 100A in order to facilitate the safe operation of vehicles 100 and 100A and the safety of the users as described in further detail below. Although only a single concierge work station 230 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the detection system 172. For example, housing 414 may include one or more laser devices for having 360 degree or narrower fields of view and one or more camera devices. Housings 416 and 418 may include, for example, one or more radar and/or sonar devices. The devices of the detection system may also be incorporated into the typical vehicle components, such as taillights 404 and/or side view mirrors 408. Each of these radar, camera, and lasers devices may be associated with processing components which process data from these devices as part of the detection system 172 and provide sensor data to the computing device 110.

Seating

Because of the nature of autonomous vehicles, or rather that autonomous vehicles do not need constant inputs from a human driver, the interior of the vehicle may be configured to adapt to the needs of the passengers who are currently (or who will next be) using the autonomous vehicle. For example, an autonomous vehicle may require only enough user inputs to allow a passenger to stop the vehicle in an emergency. In some examples, the passenger may also be provided with inputs for starting a trip and pulling the vehicle over (as opposed to an immediate emergency stop). In that regard, the vehicle need not have a fixed steering wheel or brake and acceleration pedals or other such controls. As such, the passenger who is responsible for controlling aspects of the autonomous vehicle (the priority passenger), though the aforementioned user inputs need not be located directly adjacent to a fixed steering wheel. In other words, the priority row where the priority passenger sits, need not always be a first row within the vehicle. In fact, the configuration of the rows within the vehicle may be changed based upon the number of passengers and the location of that priority passenger.

FIG. 5 is an example internal view of vehicle through the opening of door 406. In this example, there is of a row of two seats 502 for passengers with a console 504 between them. Directly in ahead of seats 502 is a dashboard configuration 506 having a storage bin area 508 and the internal electronic display 152. As can be readily seen, the vehicle does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 6:
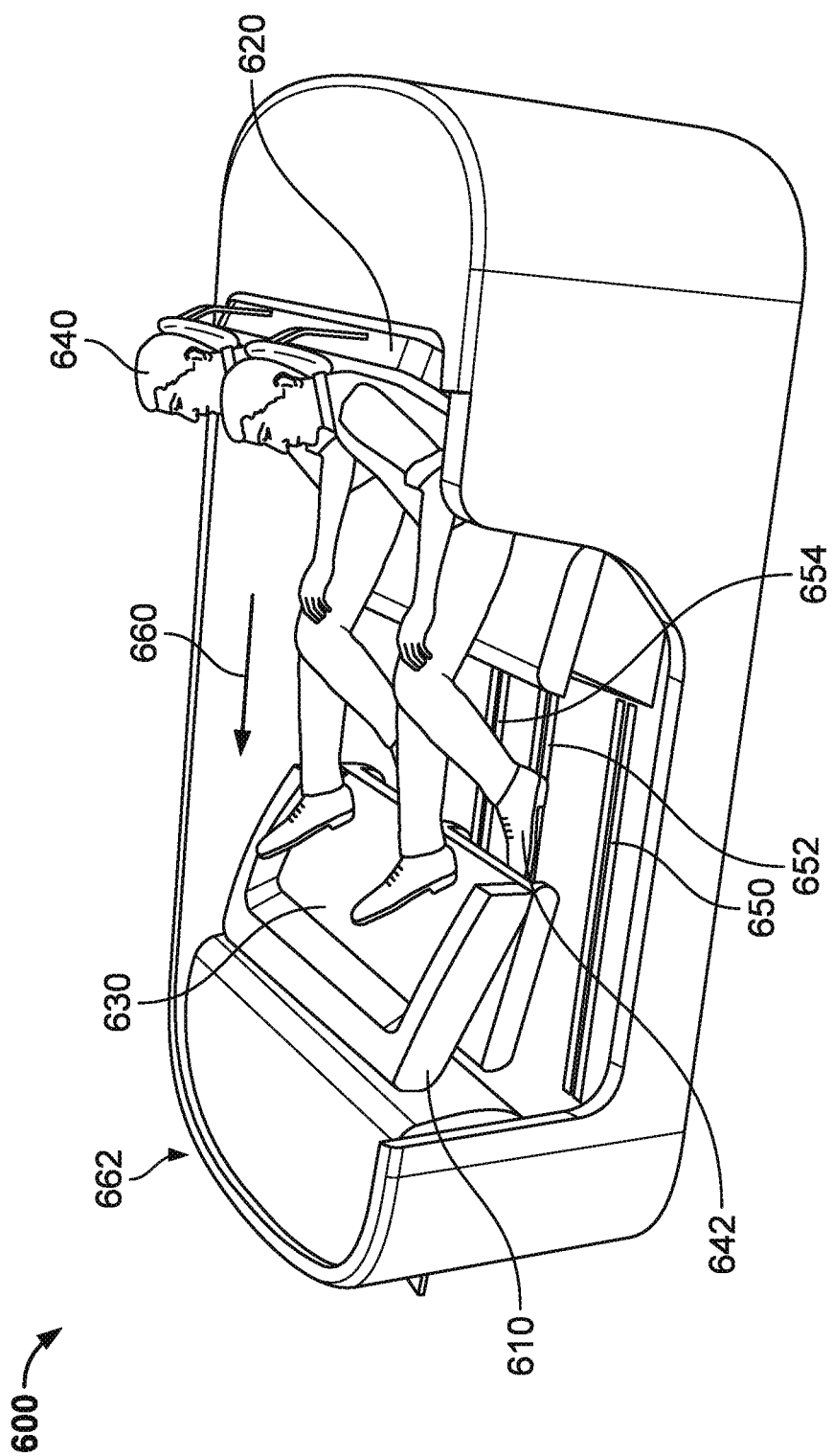

FIG. 5 is an example of a vehicle having a single row of seating. Of course, larger vehicles may have multiple rows of seating having various changeable configurations. For example, FIG. 6 is a view depicting the interior of a vehicle 600. In this example, the vehicle includes two rows of seating 610, 620. First row 610 is a bench seat having a first, passenger use configuration (not shown) to allow passengers, including the priority passenger, to sit and ride in the first row. FIG. 6 depicts first row 610 in a second, folded configuration. In this example, the second row 620 becomes the priority row in that the first row is no longer usable for passengers, and the priority passenger may sit in the second row 620. In addition, a back side 630 of first row has become a foot rest for passengers 640, 642 (either of which may be the priority passenger). In order to change from the first, passenger use configuration to the second configuration, the bench seat of first row 610 is folded and slid along a set of tracks 650, 652, 654 in the direction of arrow 660 towards the front end 662 of vehicle 600. Of course the final position of first row 610 may still allow for HVAC systems of the vehicle to function. For safety, the first row may be secured in place when in the second configuration as shown in FIG. 6.

Figure 7:
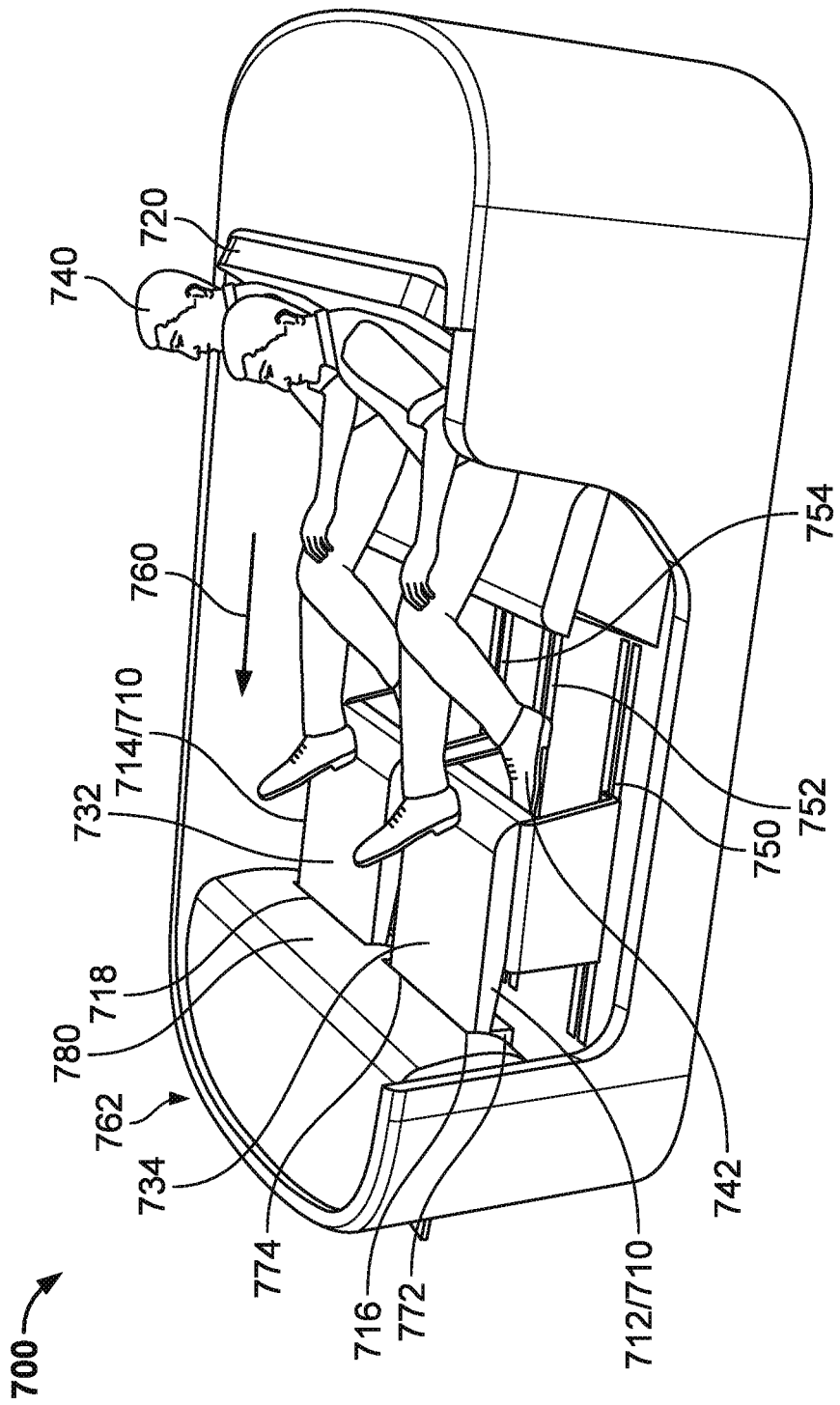

FIG. 7 is another view depicting the interior of a vehicle. In this example, the vehicle 700 includes two rows of seating 710, 720. First row 710 includes a pair of seats 712, 714 seat having a first, passenger use configuration (not shown) to allow passengers, including the priority passenger, to sit and ride in the first row.

FIG. 7 depicts first row 710 in a second, folded configuration. In this example, the second row 720 becomes the priority row in that the first row is no longer usable for passengers, and the priority passenger may sit in the second row 720. In addition, back sides 732, 734 of first row become a foot rest for passengers 740, 742 (either of which may be the priority passenger). In this example, the back sides are generally flat.

In order to change from the first, passenger use configuration to the second configuration, the seats 712, 714 of first row 710 are folded and slid along a set of tracks 750, 752, 754 in the direction of arrow 760 towards the front end 762 of vehicle 700. At least part of a headrest 772 of seat 712 is tucked under a dashboard 780 of the vehicle 700. Seat 714 may have a similar configuration.

In addition, or alternatively, rather than being simply tucked below the dashboard 780, the dashboard may include a recess 716, 718 that can accommodate at least a portion of each of the headrests and/or the seats 712, 714. In this regard, when seats are moved along the tracks, at least a portion of the headrests 772, 774 may be placed into the corresponding recess 716, 718, respectively, in the dashboard 780. Of course the final position of first row 710 may still allow for HVAC systems of the vehicle to function. For safety, the first row may be secured in place when in the second configuration as shown in FIG. 7.

Figure 8:
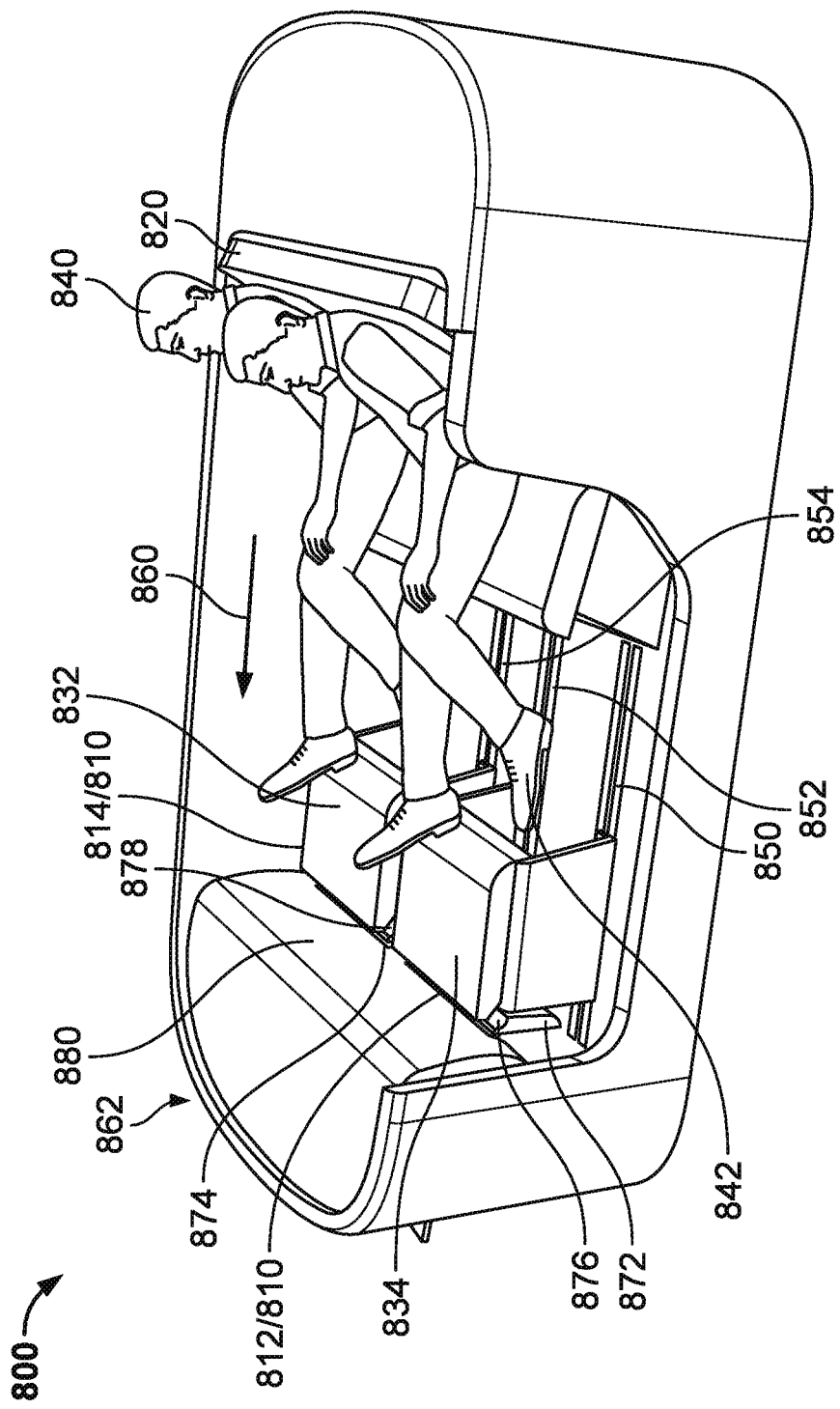

FIG. 8 is another view depicting the interior of a vehicle. In this example, the vehicle 800 includes two rows of seating 810, 820. First row 810 includes a pair of seats 812, 814 seat having a first, passenger use configuration (not shown) to allow passengers, including the priority passenger, to sit and ride in the first row.

FIG. 8 depicts first row 810 in a second, folded configuration. In this example, the second row 820 becomes the priority row in that the first row is no longer usable for passengers, and the priority passenger may sit in the second row 820. In addition, back sides 832, 834 of first row 810 become a foot rest for passengers 840, 842 (either of which may be the priority passenger). In this example, the back sides are generally flat.

In order to change from the first, passenger use configuration to the second configuration, the seats 812, 814 of first row 810 are folded and slid along a set of tracks 850, 852, 854 in the direction of arrow 860 towards the front end 862 of vehicle 800. However, unlike in the example of vehicle 700, in this example, each seat includes a hinge 874, 878 that allows a portion 872, 874 of a seat back of seats 812, 824 to be folded. This allows the seats of row 810 to be moved even further towards the front end 862 of vehicle 800 than seat 710 of vehicle 700 in the example of FIG. 7. Of course the final position of first row 810 may still allow for HVAC systems of the vehicle to function. For safety, the first row may be secured in place when in the second configuration as shown in FIG. 8.

Figure 9:
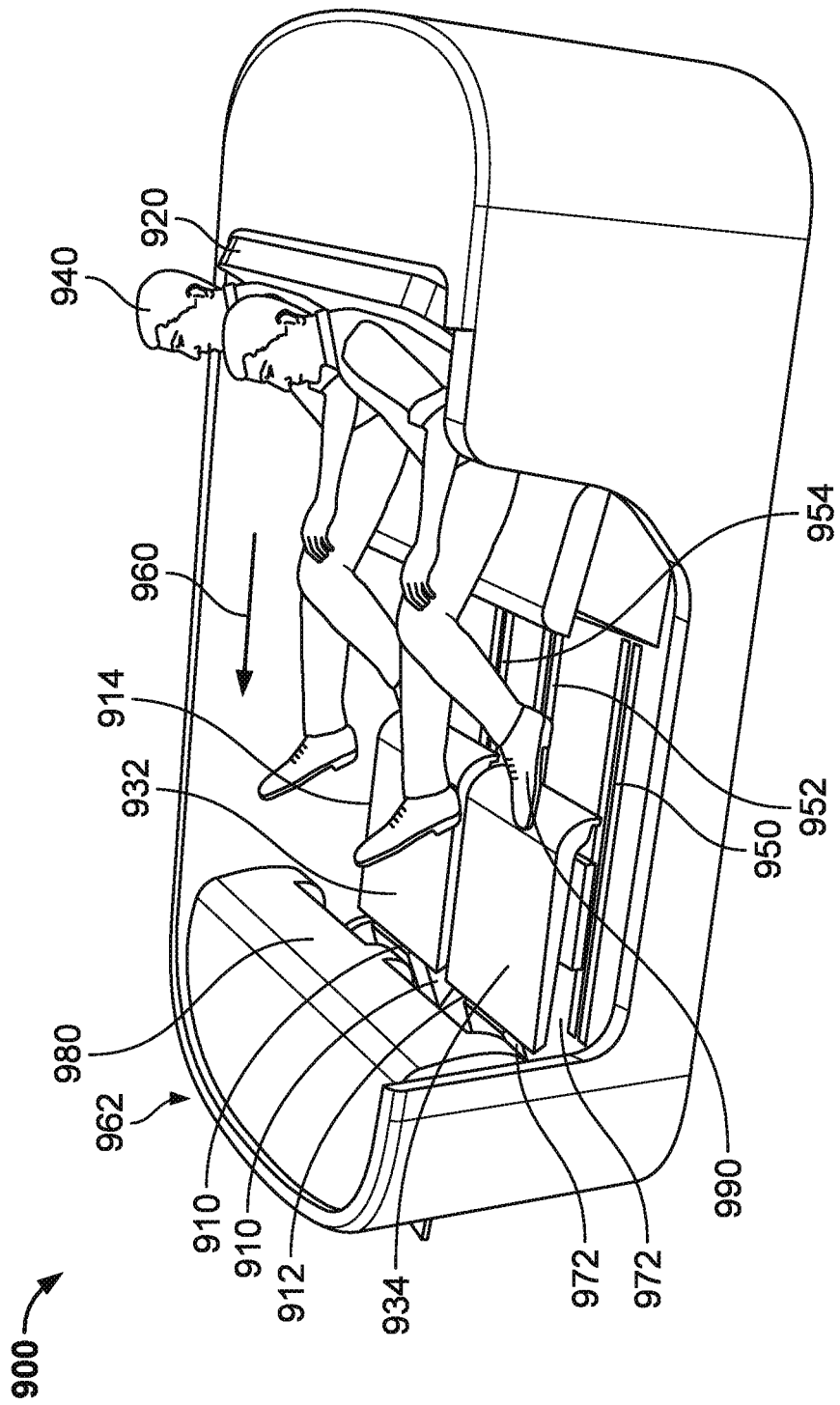

FIG. 9 is another view depicting the interior of a vehicle. In this example, the vehicle 900 includes two rows of seating 910, 920. First row 910 includes a pair of seats 912, 914 seat having a first, passenger use configuration (not shown) to allow passengers, including the priority passenger, to sit and ride in the first row.

FIG. 9 depicts first row 910 in a second, folded configuration. In this example, the second row 920 becomes the priority row in that the first row is no longer usable for passengers, and the priority passenger may sit in the second row 920. In addition, back sides 932, 934 of first row 910 become a foot rest for passengers 940, 942 (either of which may be the priority passenger). In this example, the back sides are generally flat. In order to change from the first, passenger use configuration to the second configuration, the seats 912, 914 of first row 910 are folded and slid along a set of tracks 950, 952, 954 in the direction of arrow 960 towards the front end 962 of vehicle 900. In this example, the seat 912 includes a headrest 972, a portion 974 for accommodating a passenger's back, and a base portion 976.

In the second, folded configuration, the base portion 976 of the seat 912 collapses allowing the back sides of seat 912 to be closer to the floor 990 of the vehicle 900 than seat 812 of vehicle 800. The headrest of seat 912 is tucked under a dashboard 980 of the vehicle 900. Seat 914 may have a similar configuration as seat 912. In this folded configuration where the base portion collapses, the seat becomes relatively flat without the need for a recess in the floor 900. Of course the final position of first row 910 may still allow for HVAC systems of the vehicle to function. For safety, the first row may be secured in place when in the second configuration as shown in FIG. 9.

Figure 10A:
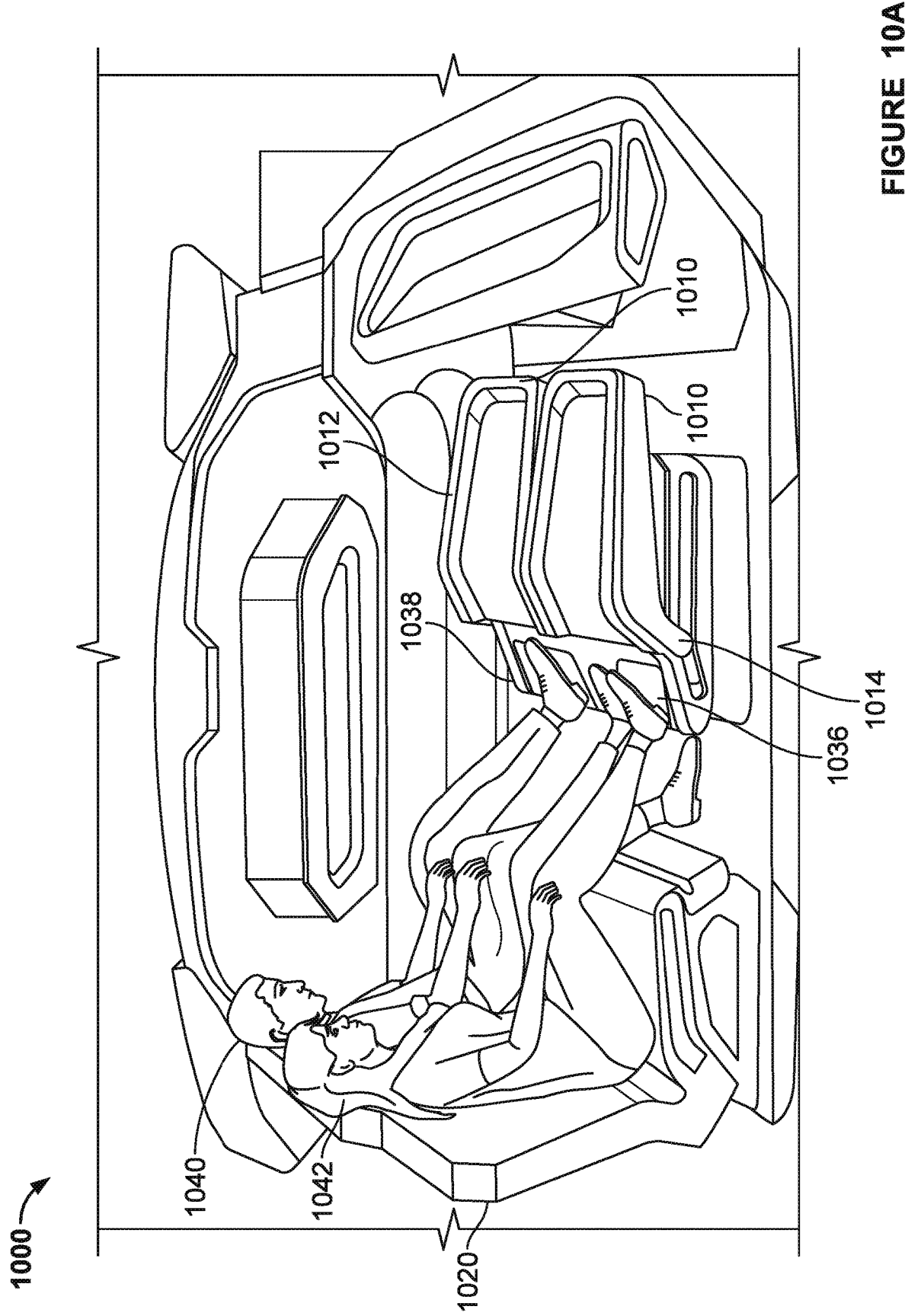

FIG. 10A is another view depicting the interior of a vehicle. In this example, the vehicle 1000 includes two rows of seating 1010, 1020. First row 1010 includes a pair of seats 1012, 1014 seat having a first, passenger use configuration (not shown) to allow passengers, including the priority passenger, to sit and ride in the first row.

FIG. 10A depicts first row 1010 in a second, folded configuration. In this example, the second row 1020 becomes the priority row in that the first row is no longer usable for passengers, and the priority passenger may sit in the second row 1020. In addition, back sides 1032, 1034 of first row 1010 include an extension 1036, 1038 which becomes a foot rest for passengers 1040, 1042 (either of which may be the priority passenger) when seats 1012 and 1014 are in the second folded, configuration. The extension may help to keep the rest of seats 1012, 1014 free from debris. In this example, the seats need not be arranged on tracks as in the examples of vehicles 600-900. For safety, the first row may be secured in place when in the second configuration as shown in FIG. 10A.

Figure 10C:
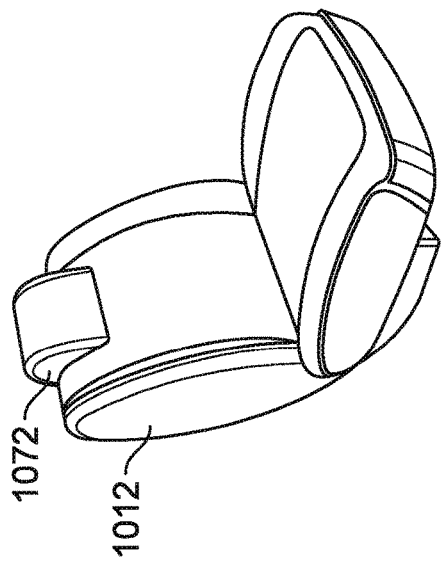
Figure 10B:
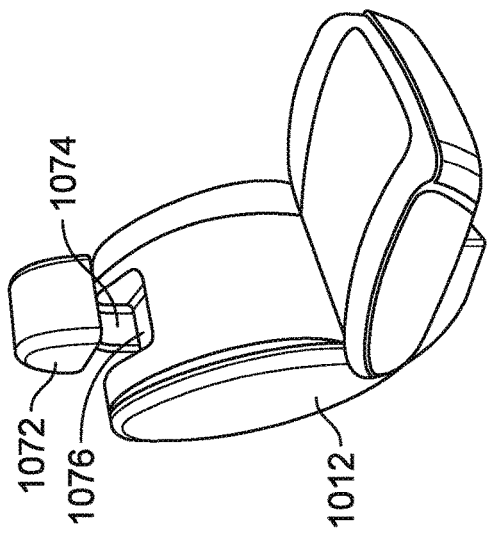
Figure 10E:
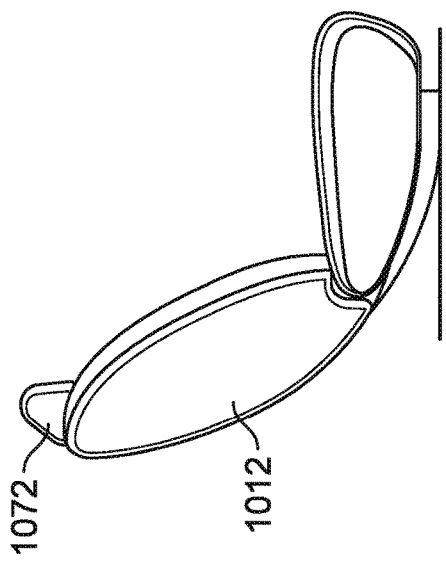
Figure 10D:
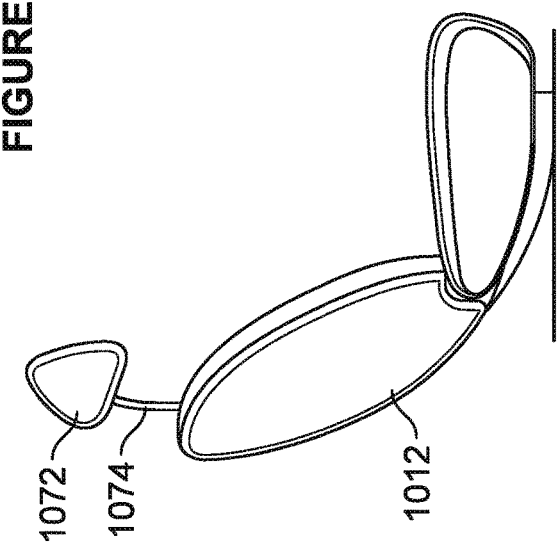

As shown in FIG. 10A, the headrest of seats 1012, 1014 virtually disappear when the seats 1012, 1014 are in the second, folded configuration. FIGS. 10A-10F depict example headrest configurations which allow the headrest to virtually disappear. For example, in FIG. 10B, seat 1012 is depicted with headrest 1072 and headrest supports in a fully extended condition. As can be seen, the shape of recess 1076 below the one or more supports 1074 of the headrest 1072 corresponds to the shape of the headrest 1072. Thus, when the supports are retracted into the seat 1012, the headrest 1012 fits into the recess 1076 as shown in FIG. 10C. FIGS. 10D and 10E are example side views of seat 1012 depicting headrest 1072 in the fully extended (10D) and fully retracted (10E) conditions. The headrest 1072 then appears to become an integral part of the seat 1012. Accordingly, when the headrest 1072 is fully retracted, as shown in FIG. 10C, the headrest 1012 virtually disappears as shown in the example of FIG. 10A.

FIG. 10F depicts an alternative example of a retractable headrest which when fully retracted virtually disappears or appears to become an integral part of the seat. In this example, seat 1012' is depicted with a headrest 1072' and one or more supports 1074' in a fully extended condition. The shape of recess 1076' corresponds to the shape of the headrest 1072' such that when the headrest 1072' and the one or more supports 1074' are fully retracted into the seat 1012', the headrest 1072' appears to disappear into and become an integral part of the seat 1012' as can be seen by reference to seat 1014' and headrest 1074'. Thus, this example and many other similar configurations, may also be used to achieve the appearance of the example of FIG. 10A.

Figure 10G:
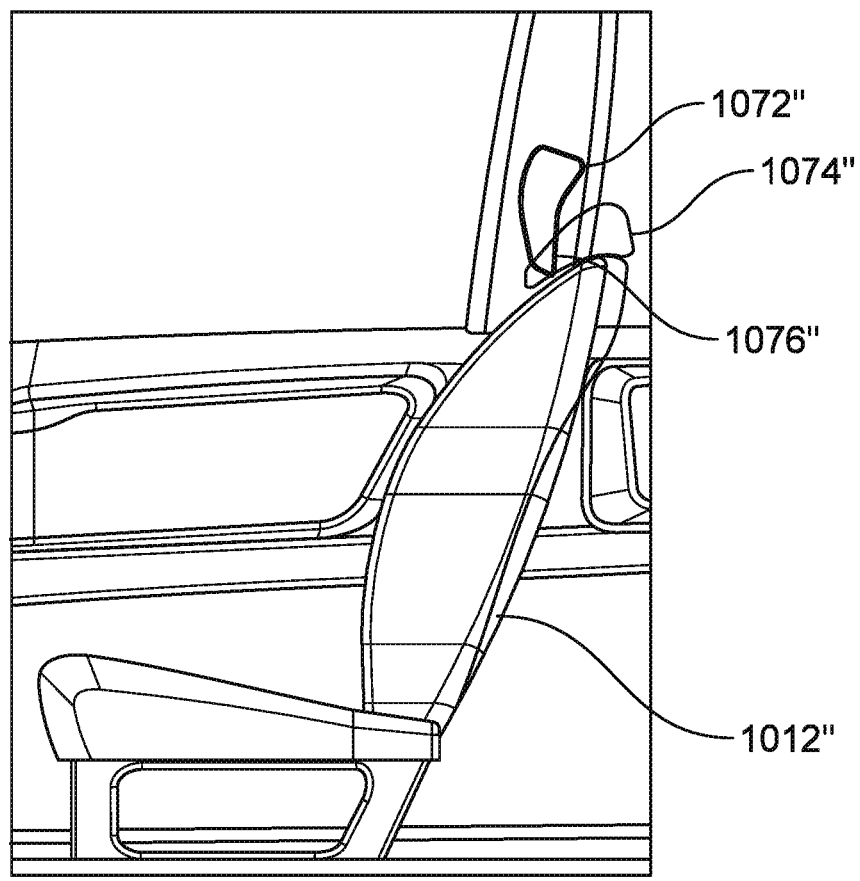

FIG. 10G depicts another example of a folding headrest winch can virtually disappear or appear to become an integral part of the seat. For example, in FIG. 10G, seat 1012" is depicted with a headrest in two configurations at once. Headrest 1072" is shown in a use configuration in order to provide a passenger with head and neck support for comfort and also in the event of a collision. Headrest 1074" (shown in outline) is the same has headrest 1072", but is shown in a second, folded configuration. As can be seen, the headrest folds or pivots towards or away from the seat 1012" in order to change between configurations. The curved shape of the back of the headrest allows the headrest to fit tightly against the seat 1012" when in the second, folded configuration of headrest 1074". In this condition, the headrest 1072" appears to become an integral part of the seat 1012. Accordingly, when the headrest 1072" is fully retracted, as shown in FIG. 10C, the headrest 1072" virtually disappears and becomes a part of the seat 1012" as in the example of FIG. 10A.

Figure 11:
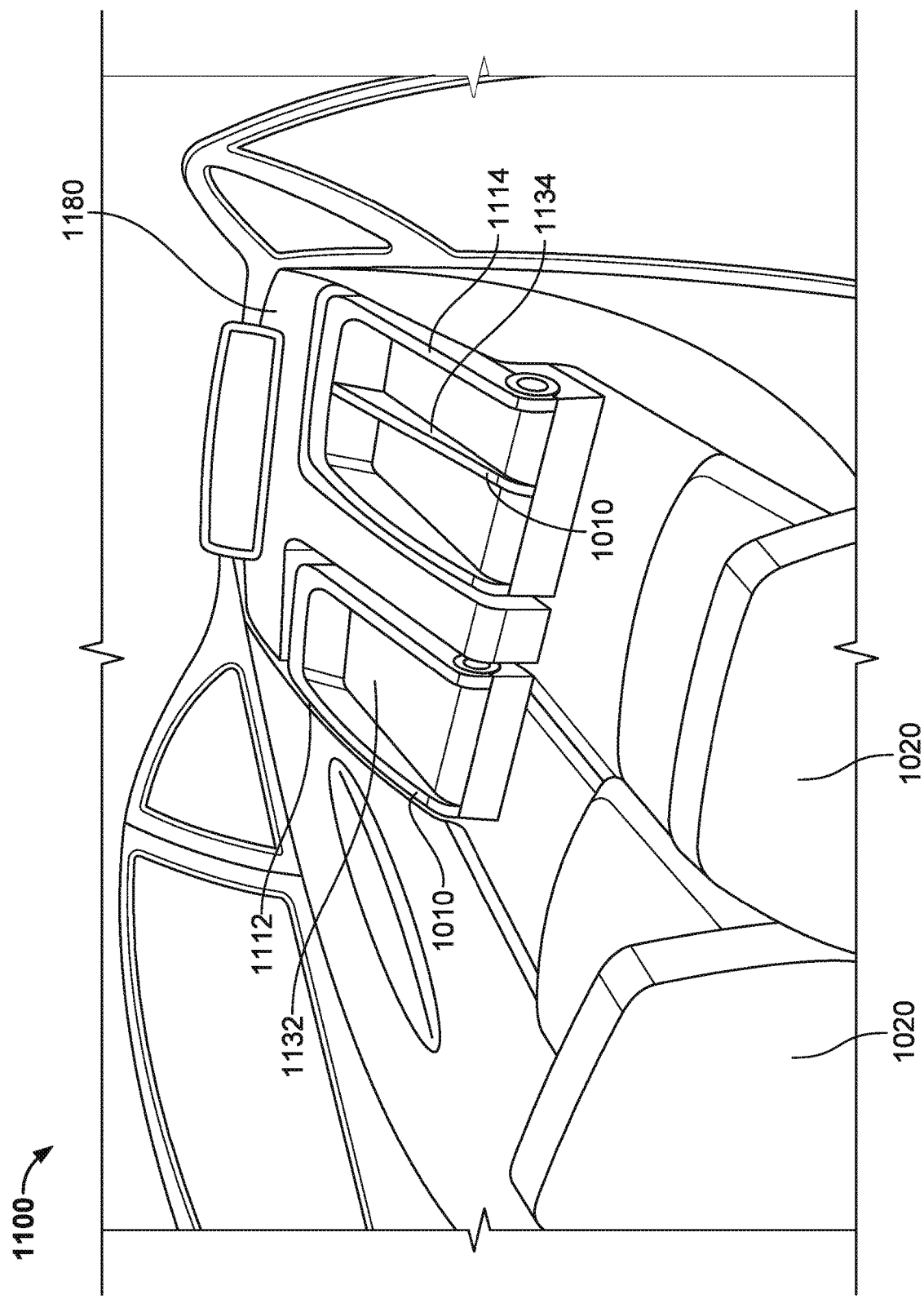
FIGS. 11-14 are example interview views of vehicles in accordance with aspects of the disclosure.

FIG. 11 is another view depicting the interior of a vehicle. In this example, the vehicle 1100 includes two rows of seating 1110, 1020. First row 1110 includes a pair of seats 1112, 1114 seat having a first, passenger use configuration (not shown) to allow passengers, including the priority passenger, to sit and ride in the first row.

FIG. 11 depicts first row 1110 in a second, folded configuration. In this example, the second row 1120 becomes the priority row in that the first row is no longer usable for passengers, and the priority passenger may sit in the second row 1120. The shape of the seats 1112, 1114 in combination with the shape of the dashboard 1180 allows the seats 1112, 1114 to fold and fit into the dashboard as shown. The fit is such that the back sides 1132, 1134 of first row 1010 appear to be integrated with the dashboard 1180. As such, a passenger in the second row may not even notice that a first row of seats was ever present in the vehicle.

In addition, the backsides 1132, 1134 may provide a passenger in the second row with space for items. For instance the backsides may include cup holders or trays, and/or as in the examples above, may become a foot rest for passengers (not shown, but also including the priority passenger) when seats 1112 and 1114 are in the second folded, configuration. In this example, the seats need not be arranged on tracks as in the examples of vehicles 600-900 or may simply fold from the first passenger use configuration. For safety, the first row may be secured in place when in the second configuration as shown in FIG. 11.

Figure 12:
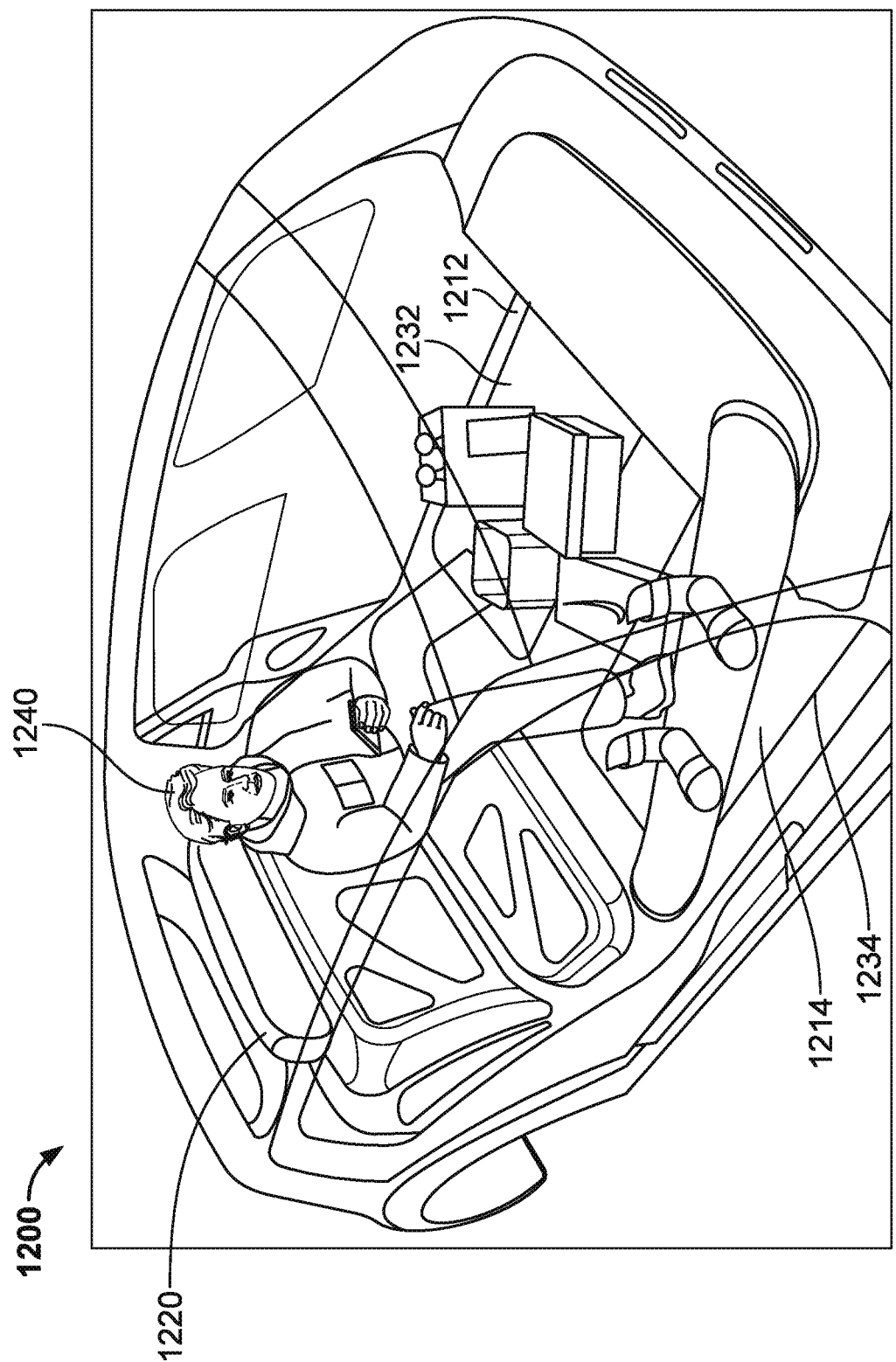

FIG. 12 is another view depicting the interior of a vehicle. In this example, the vehicle 1200 includes two rows of seating 1210, 1220. First row 1210 includes a pair of seats 1212, 1214 seat having a first, passenger use configuration (not shown) to allow passengers, including the priority passenger, to sit and ride in the first row.

FIG. 12 depicts first row 1210 in a second, folded configuration. In this example, the second row 1220 becomes the priority row in that the first row is no longer usable for passengers, and the priority passenger may sit in the second row 1220. Recesses in the floor 1290 of the vehicle (not shown) below seats 1212, 1214, allows the seats to fold and fit into the floor 1290 as shown. The fit is such that the back sides 1232, 1234 of first row 1210 appear flush with or integrated into the floor 1290 of vehicle 1200. In this example, as with FIG. 9 above (which does not include a recess), the base of the seat may be collapsible (as discussed in further detail below) to save space, and as with the example of FIGS. 10A-F, the seats may also include a retractable headrest that retracts into a recess in the seat to further save space.

In addition, the backsides 1232, 1234 may also become a foot rest for passenger 1240 (who may be the priority passenger) when seats 1212 and 1214 are in the second folded, configuration. In this example, the seats need not be arranged on tracks as in the examples of vehicles 600-900. For safety, the first row may be secured in place when in the second configuration as shown in FIG. 12.

Figure 13:
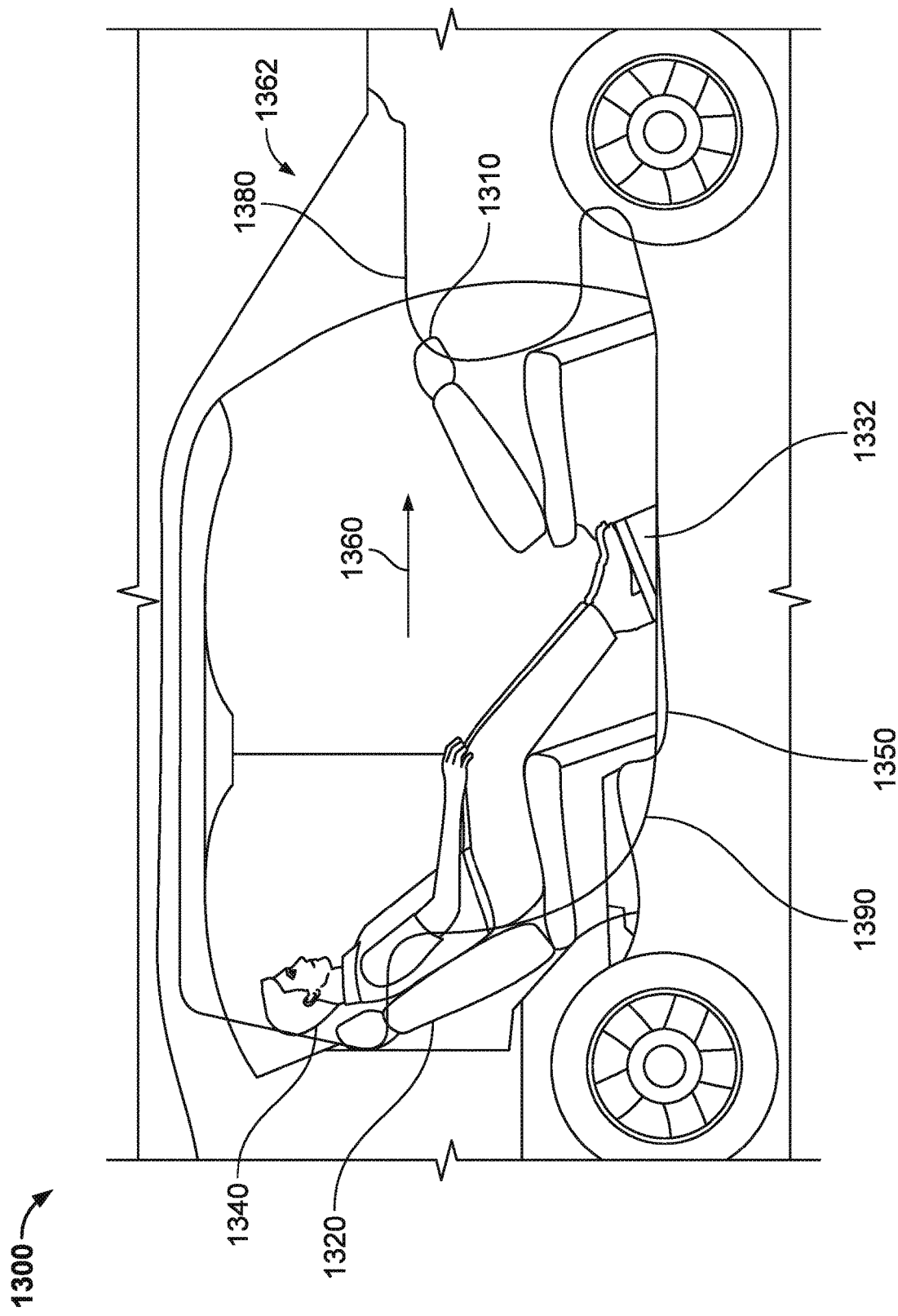

FIG. 13 is another view depicting the interior of a vehicle. In this example, the vehicle 1300 includes two rows of seating 1310, 1320. First row 1310 may include a pair of seats or bench seat having a first, passenger use configuration (not shown) to allow passengers, including the priority passenger, to sit and ride in the first row.

FIG. 13 depicts first row 1310 in a second, folded configuration similar to the second, folded configuration of vehicle 600. In this example, the second row 1320 becomes the priority row in that the first row is no longer usable for passengers, and the priority passenger, for example passenger 1340, may sit in the second row 1220. Rather than the seat becoming a foot ret, the floor 1390 of the vehicle may have a foot rest 1332 (or a foot rest for each seat of front row). In this example foot rest 1332 may pop up from the floor only when the front row 1310 is in the second, folded configuration.

In order to change from the first, passenger use configuration to the second configuration, the first row 1310 is folded and slid along a set of tracks 1350 in the direction of arrow 1360 towards the front end 1362 of vehicle 1300. In this example, when in the second, folded configuration, the front row rests on the dashboard 1380. Of course the final position of first row 1310 may still allow for HVAC systems of the vehicle to function. For safety, the first row may be secured in place when in the second configuration as shown in FIG. 13.

Figure 14:
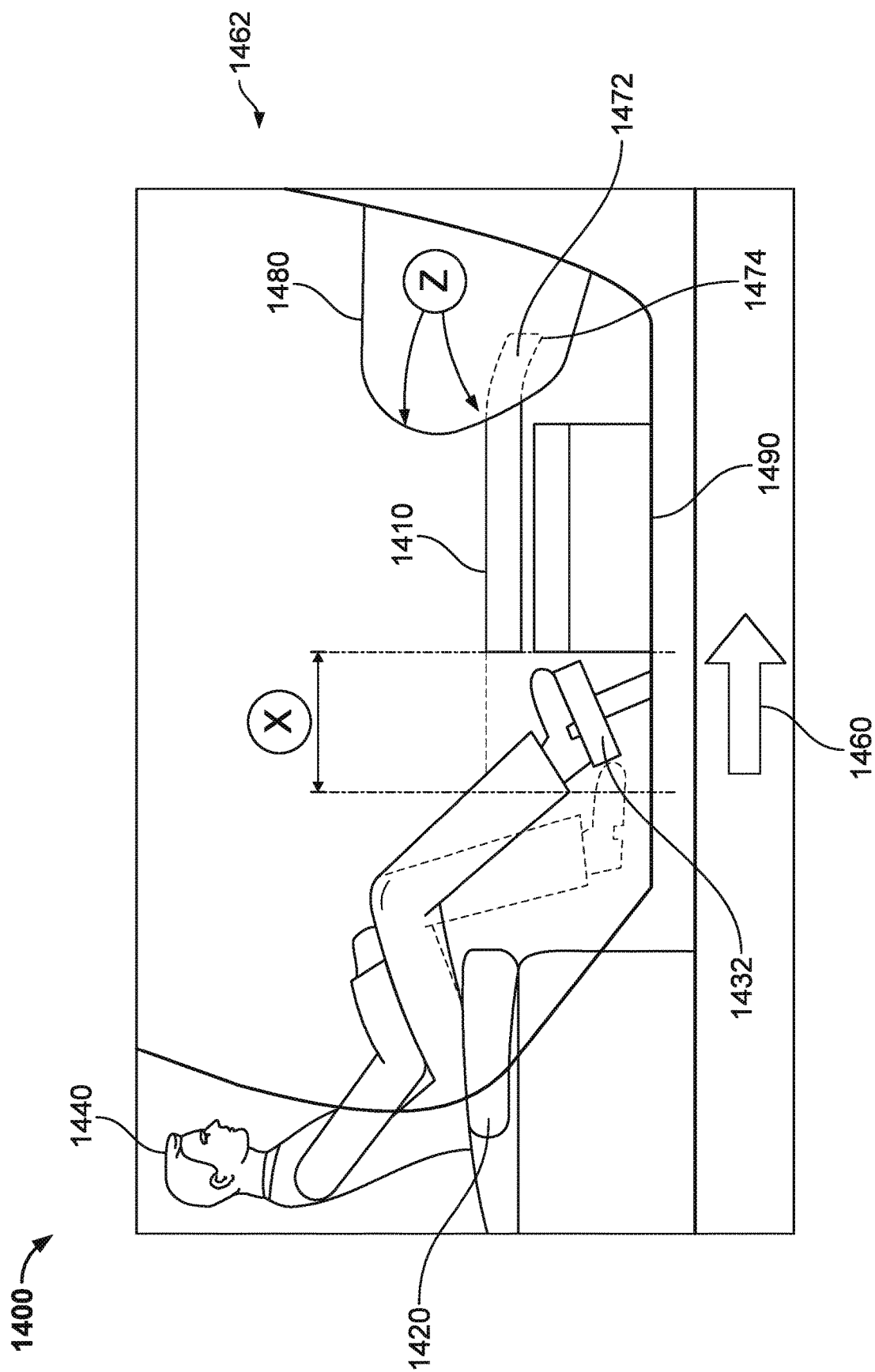

FIG. 14 is another view depicting the interior of a vehicle. In this example, the vehicle 1400 includes two rows of seating 1410, 1420. First row 1210 may include a pair of seats or bench seat having a first, passenger use configuration (not shown) to allow passengers, including the priority passenger, to sit and ride in the first row. FIG. 14 depicts first row 1410 in a second, folded configuration similar to the second, folded configuration of vehicle 600. In this example, the second row 1420 becomes the priority row in that the first row is no longer usable for passengers, and the priority passenger may sit in the second row. Rather than the seat of row 1410 becoming a foot ret, the floor 1490 of the vehicle may have a foot rest 1432 (or a foot rest for each seat of front row). In this example foot rest 1432 may pop up from the floor only when the front row 1410 is in the second, folded configuration.

In order to change from the first, passenger use configuration to the second configuration, the first row 1410 is folded and slid along a set of tracks (not shown) in the direction of arrow 1460 towards the front end 1462 of vehicle 1400. In this example, when in the second, folded configuration, rather than being tucked below the dashboard, the dashboard may include a recess 1474 for each of the headrests 1472 of the front row 1410 (similar to the example of FIG. 7, but here, including a popup footrest). In this regard, when seats are moved along the tracks (not shown), at least a portion of the headrests may be placed into the corresponding recess in the dashboard. The distance X identifies the amount of extra legroom provided to passenger 1440, who may be the priority passenger, when the first row is moved along the tracks into the second, folded configuration. The distance Z identifies the added distance in X which is provided by sliding the headrests 1472 into the recess 1474. Of course the final position of first row 1410 may still allow for HVAC systems of the vehicle to function. For safety, the first row may be secured in place when in the second configuration as shown in FIG. 14.

Figures 15A, 15B, 15C, 15D:
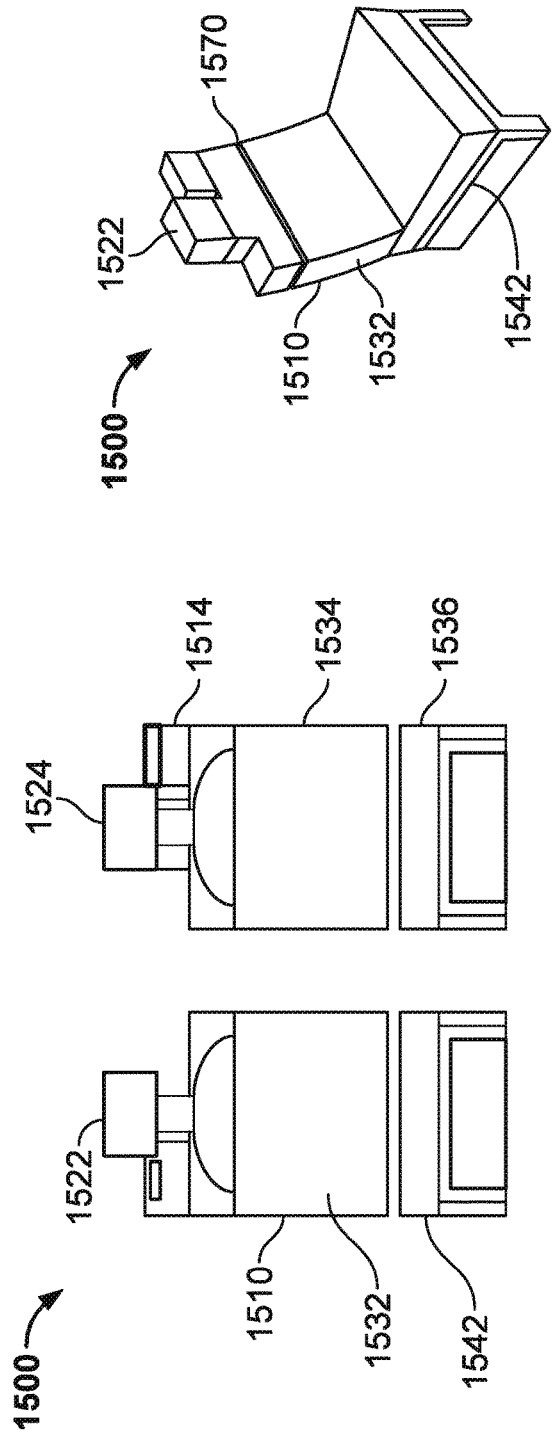
FIGS. 15A-15D is an example of changing a seat from a first, passenger use configuration to a second, folded configuration in accordance with aspects of the disclosure.

In order to achieve the second, folded configurations discussed above, the seats may themselves have various configurations. FIGS. 15A-D is an example 1500 of changing a seat from a first, passenger use configuration to a second, folded configuration. FIG. 15A depicts a first row 1510 includes seats 1512, 1514 having a headrest 1522, 1524, a portion 1532, 1534 for supporting the back of a passenger, and a base 1542, 1544. Each of seats 1512, 1514 includes a hinge line 1570 through the portion (as opposed to between the seat and the headrest or at the headrest). This hinge line may correspond to the hinges of the example of FIG. 8.

FIG. 15B is a front view of seat 1510 in the first, passenger use configuration. In FIG. 15C, portion 1532 of seat 1512 is folded onto base 1542. In addition, seat 1512 is moved on tracks 1550, 1552 in the direction of arrow 1560 towards the front end 1562 of the vehicle (shown in FIG. 15D). At this point, a foot rest 1572 (shown in FIG. 15D) for a passenger in the second row may pop (for instance using a spring mechanism) or be pulled out of the floor of the vehicle. In FIG. 15D, the fold line of the portion 1532 is used to separate the portion into a top 1532*a* (attached to headrest 1522) and a bottom 1532*b*. The top 1532*a* and headrest are then folded back at the hinge line 1570 towards a back side of the bottom 1532*a*.

Figure 16:
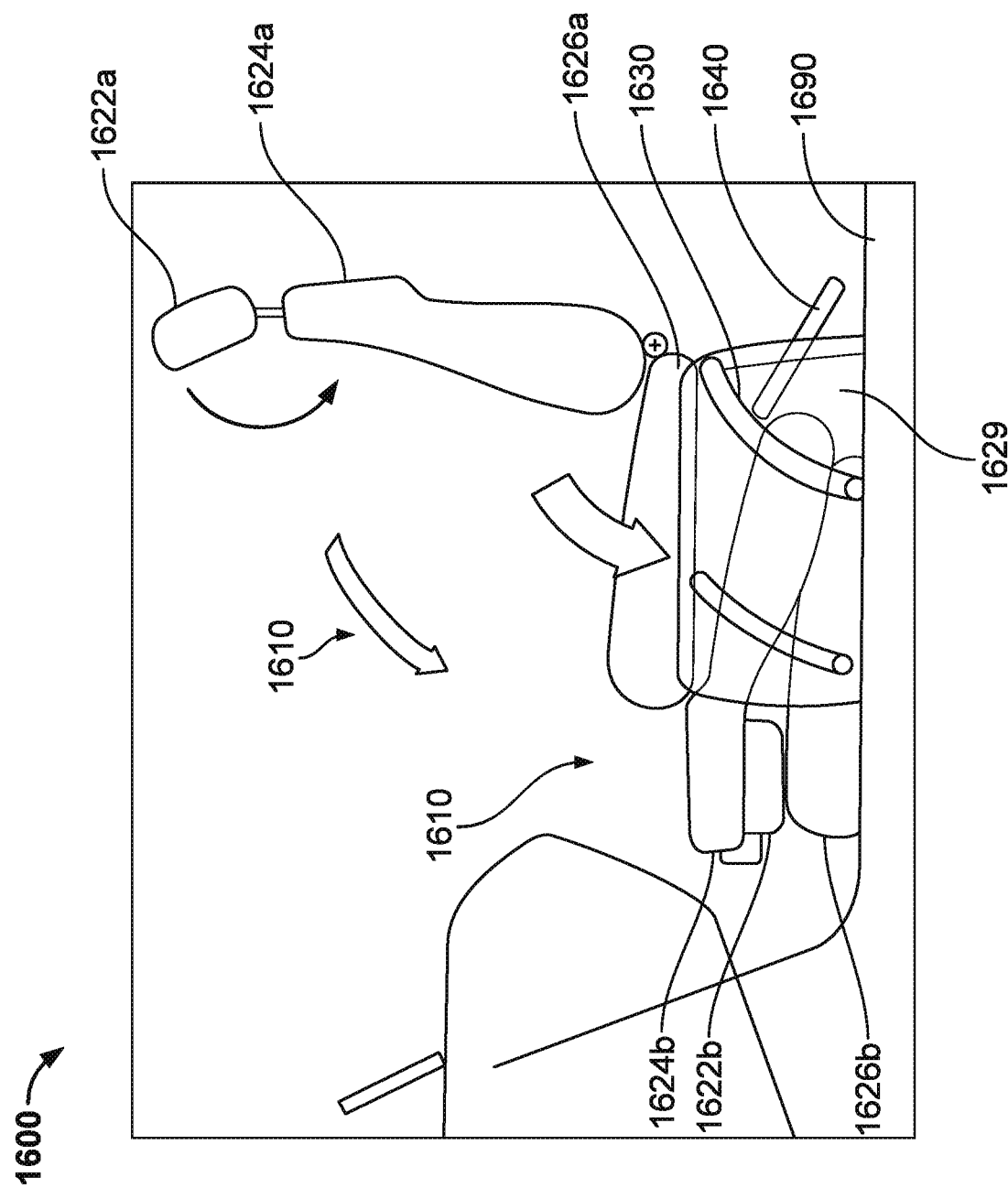
FIG. 16 is an example of a seat in a first, passenger use configuration and a second, folded configuration in accordance with aspects of the disclosure.

FIG. 16 is an example 1600 of changing a seat from a first, passenger use configuration to a second, folded configuration. In this example, a seat 1610 is depicted in the two configurations (a and b) at the same time. Seat 1610*a, b* includes a headrest 1622*a, b*, a portion 1624*a, b* for supporting the back of a passenger, a base cushion 1626*a, b*, a base support structure 1628 (only shown in the first, passenger use configuration). The base support structure includes two side support structures 1629 (only a single being shown in the view of FIG. 16). The "a" reference numerals represent the features of seat 1610 first, passenger use configuration and the "b" reference numerals represent the features of seat 1610 in the second, folded configuration. From the first configuration, headrest 1622*a* is folded down towards the portion 1624*a*. From there, the portion 1624*a* is folded towards the base cushion 1622*a*. The base support structure 1626*a* is then collapsed on itself, for example, by folding down a support 1630 of the base support structure 1628. This allows a footrest 1640 for a second row passenger (not shown and who may be the priority passenger) to pop out of the floor 1690 of the vehicle. However, when the support 1630 of the base support structure 1628 is folded down, the two side supports 1629 may actually remain upright and stationary. In that regard, the folded seat 1610 is positioned between the two side support structures 1629. In addition, when the seat 1610 is in the second, folded, configuration the headrest 1622*b* is tucked between the portion 1624*b* and base cushion 1626*b*.

FIGS. 17A-7F is an example 1700 of additional folding seat configurations. FIG. 17A is another view depicting the interior of a vehicle. In this example, the vehicle includes two rows of seating 1710, 1720. First row 1710 may include a pair of seats or bench seat having a first, passenger use configuration (not shown) to allow passengers, including the priority passenger, to sit and ride in the first row.

FIG. 17A-B depicts changing a seat from a first, passenger use configuration to a second, folded configuration. In this example, a seat 1710 is depicted in the two configurations (a and b) at the same time. Seat 1710*a, b* includes a headrest 1722*a, b*, a portion 1724 for supporting the back of a passenger, a base cushion 1726, and a base support structure 1727. In this example, seat 1710 includes a hinge line 1770 through the portion that divides portion into a first section 1742*a, b* and a second section 1744*b*. The "a" reference numerals represent the features of seat 1710 first, passenger use configuration and the "b" reference numerals represent the features of seat 1710 in the second, folded configuration. The location of the hinge line can be selected based on the size and shape of the resulting folded seat as well as locations that would be aesthetically pleasing when viewing the seat from a side perspective of the seat (such as when a passenger is entering the vehicle).

From the first configuration, headrest 1722*a* and first section 1742*a* are folded as a unit towards the first portion 1744*a*. From there, the second portion 1744*a* is folded towards the base cushion 1726. The headrest 1722*b* may also fold back towards the first section 1742*b* in order to get a closer fit between the first section 1742*b* and the base cushion 1726. In addition, the seat 1710 may be slid along tracks 1750, 1752 towards the front end of the vehicle (shown in FIGS. 17C and 17D). This may allow a footrest 1772 for a second row passenger 1740 to pop out of the floor 1790 of the vehicle. In this example, as can be seen in FIGS. 17A-B, at least a portion of the headrest 1722*b* is tucked under a dashboard 1780 of the vehicle.

FIGS. 17C and 17D depict examples of the folded configuration of FIGS. 17A-17B combined with the collapsible base example of FIG. 16. As shown, the base support structure 1727 includes two side supports 1728, 1729. In this example, a support (not shown, but comparable to support 1630 of FIG. 16) of the base support structure 1727 is folded to allow the base structure to collapse between the two support structures 1728, 1729. By doing so, there is room for the base cushion 1726 to tuck into a space between the two sides supports as shown in FIG. 17C. In the example of FIG. 17D, the base support structure 1727 is even further collapsed, allowing at least some of the portion 1724 to also tuck into the space between the two sides supports. By doing so, the seat 1712 may even be tucked under the dashboard 1780 as shown in FIG. 17D.

Figure 17F:
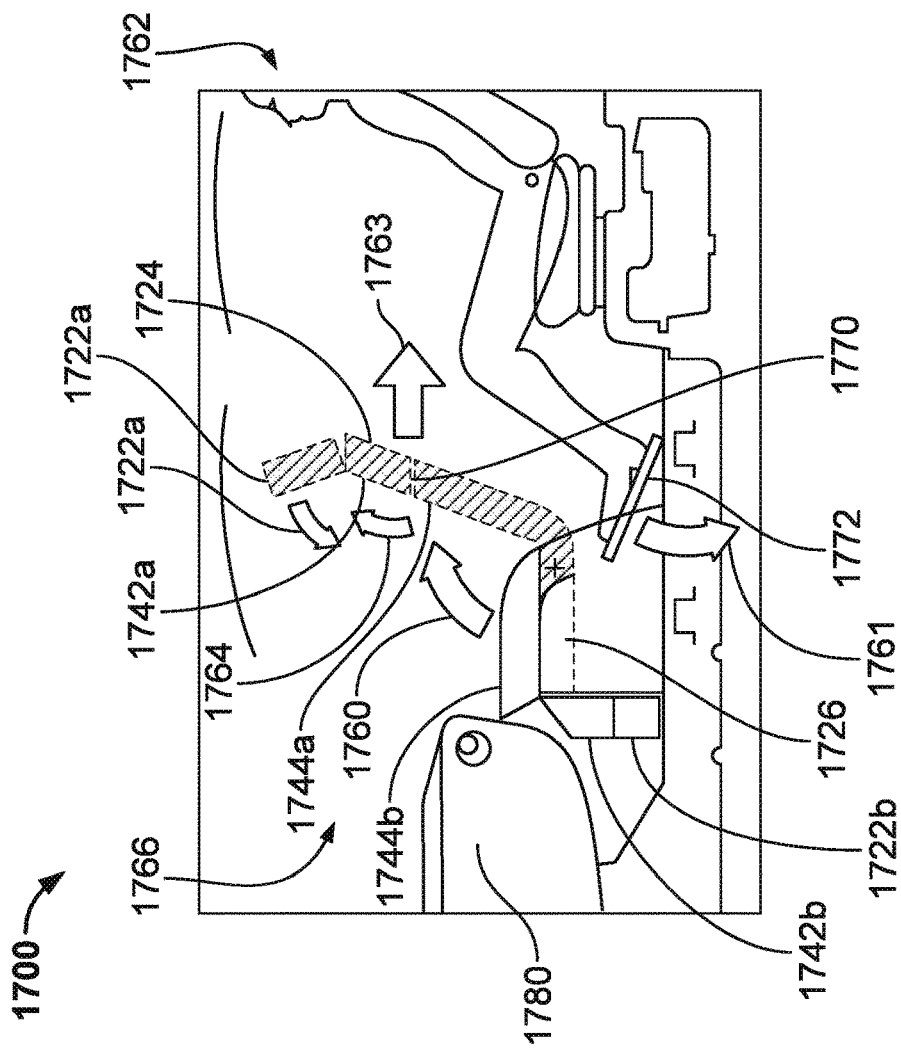
Figure 17E:
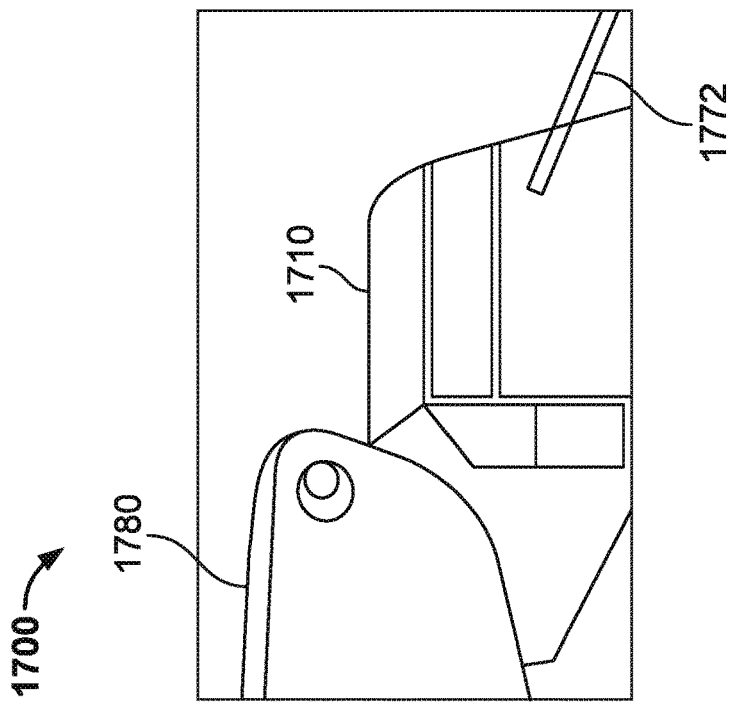

FIGS. 17E-F depict changing a seat from the second, folded configuration to the first, passenger use configuration. In FIG. 17F, seat 1710 is depicted in the two configurations (a and b) at the same time. From the second configuration, headrest 1722*b* and first section 1742*b* are pulled up from below the dashboard 1780. Second section 1744*a* is then unfolded and moved in the direction of arrow 1760 towards the rear end of the vehicle 1762. From there, headrest 1722*b* and first section 1742*b* are pulled up and away from the second portion 1744*b* about the hinge line 1770 in the direction of arrow 1764 to the position of first section 1724*a*. Headrest 1722*b* is then tilted forward (toward the front end 1766 of the vehicle) in the direction of arrow 1768. In addition, footrest 1750 is tucked below the seat 1710 in the direction of arrow 1761, and the seat 1710 may be slid in the direction of arrow 1763 along tracks (not shown) towards the rear end 1762 of the vehicle.

Figure 18A:
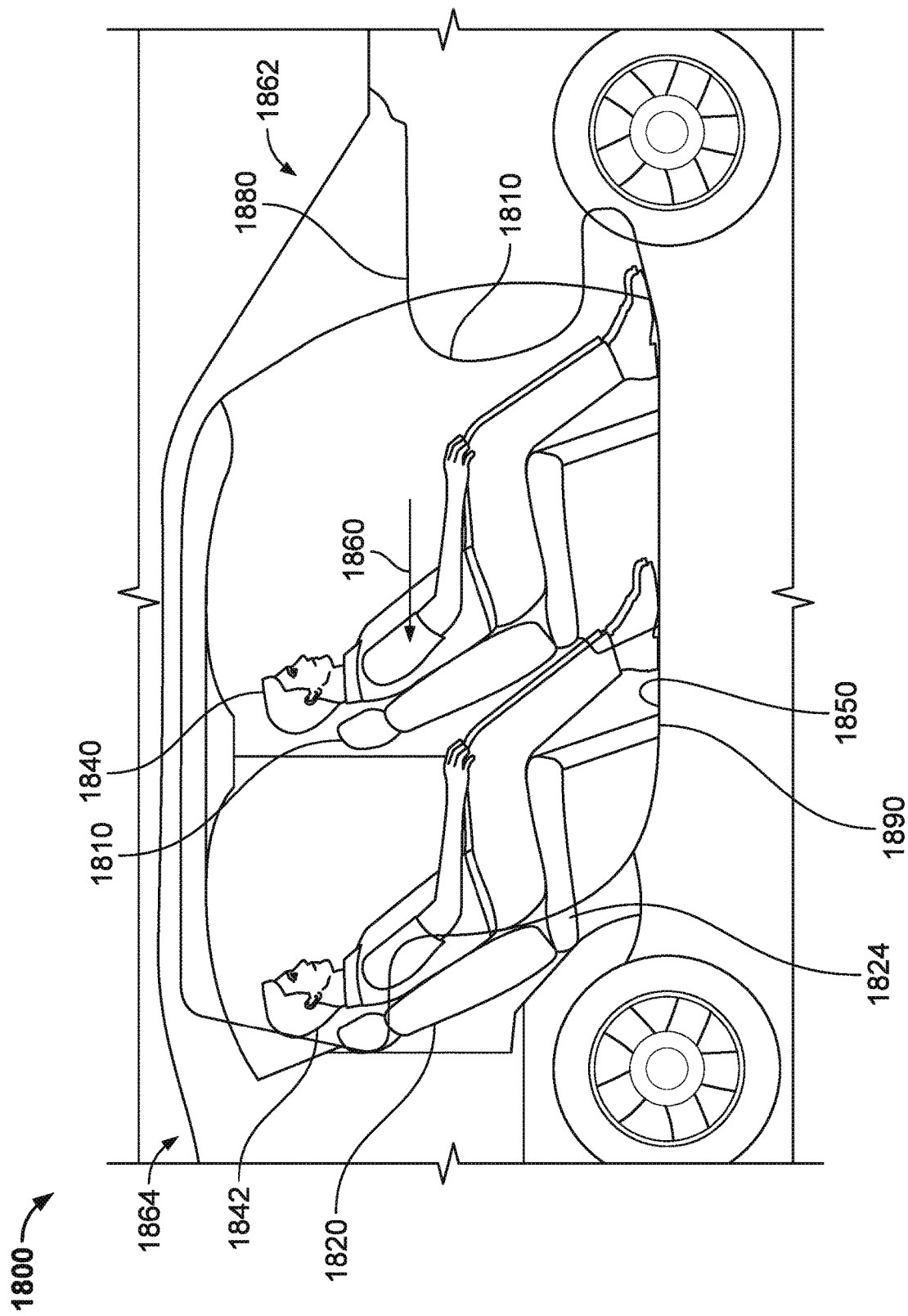
Figure 18B:
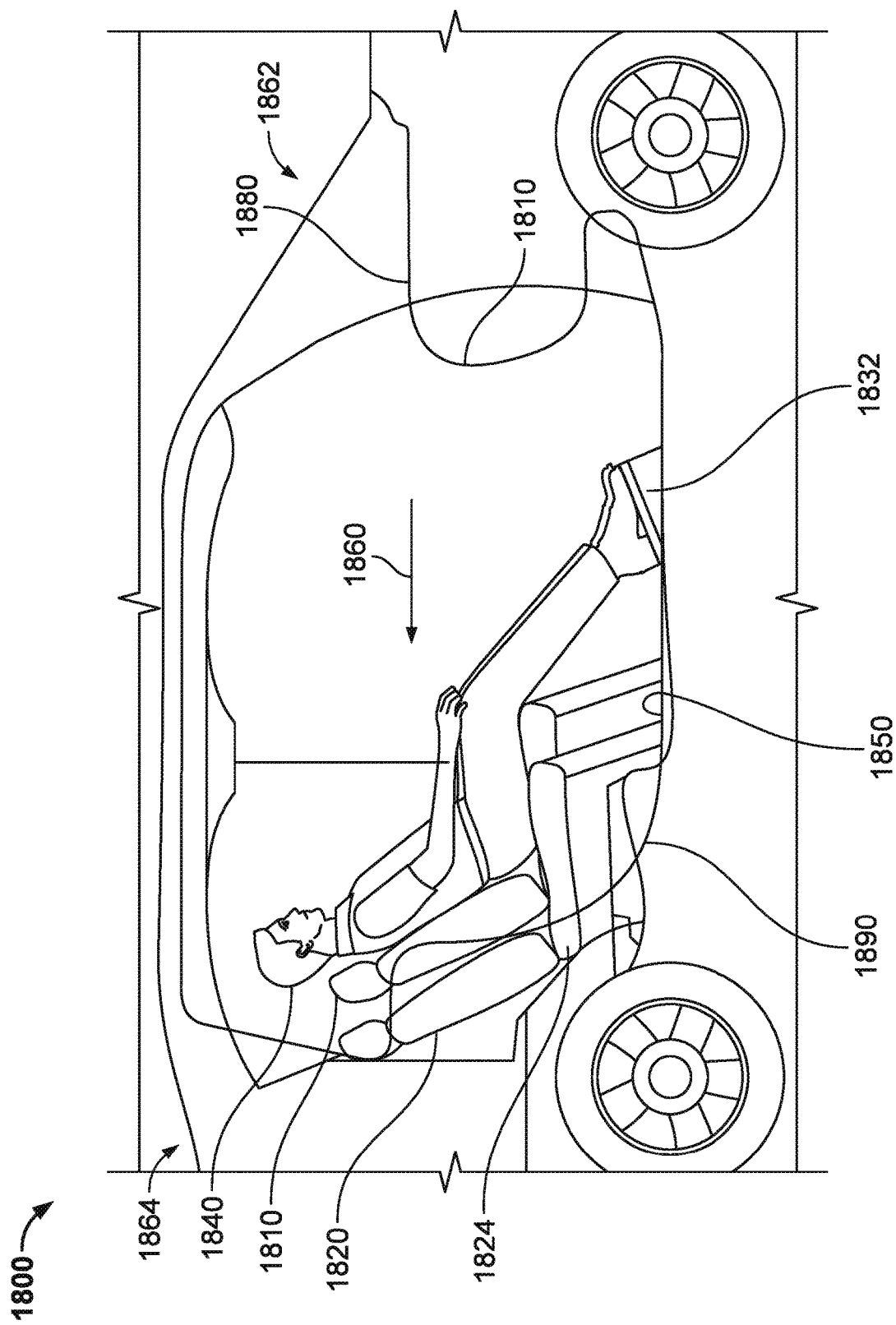

FIGS. 18A and 18B are views depicting the interior of a vehicle. In this example, the vehicle 1800 includes two rows of seating 1810, 1820. First row 1810 may include a pair of seats or bench seat having a first, passenger use configuration shown in FIG. 18A, to allow passengers, including passenger 1840 who may be the priority passenger 1840, to sit and ride in the first row 1810, as well as passenger 1842 to sit and ride in the second row 1820.

FIG. 18B depicts first row 1810 in a second, additional legroom configuration having only a single row for passengers. In this example, rather than folding the first row to achieve the second configuration, the first row is "stacked" onto the second row by moving the first row back over the second row. In other words, the first row 1810 is slid along a set of tracks 1850 in the direction of arrow 1860 towards the rear end 1864 of vehicle 1800 (1862 indicates the direction of the front end of the vehicle). To provide a better fit with the stacking and to also increase the comfort of the second row, prior to moving the first row back over the second row, the second row may be moved downwards towards the floor 1890 of the vehicle. This may be achieved, for example, by using the collapsible base of the example of FIG. 16. The difference in the height of the base cushion 1824 of the second row is readily apparent by comparing FIGS. 18A and 18B.

In addition, in this example, the first row 1810 remains the priority row (as the priority passenger 1840 is still in the first row 1810), and the second row is no longer usable for passengers. Foot rest 1832 may pop up from the floor only when the front row 1810 is in the second, additional legroom configuration. For safety, the first row may be secured in place when in the second, additional legroom configuration as shown in FIG. 18A.

In this example, by maintain the priority of the first row even when the second row is not usable, the rear seats need not meet the same legally mandated crash test standards as the first row. In that regard, each of the examples above depicting a second row as becoming a priority row, the second row may also be required to meet the same legally mandated crash test standards as the first row.

Figure 19:
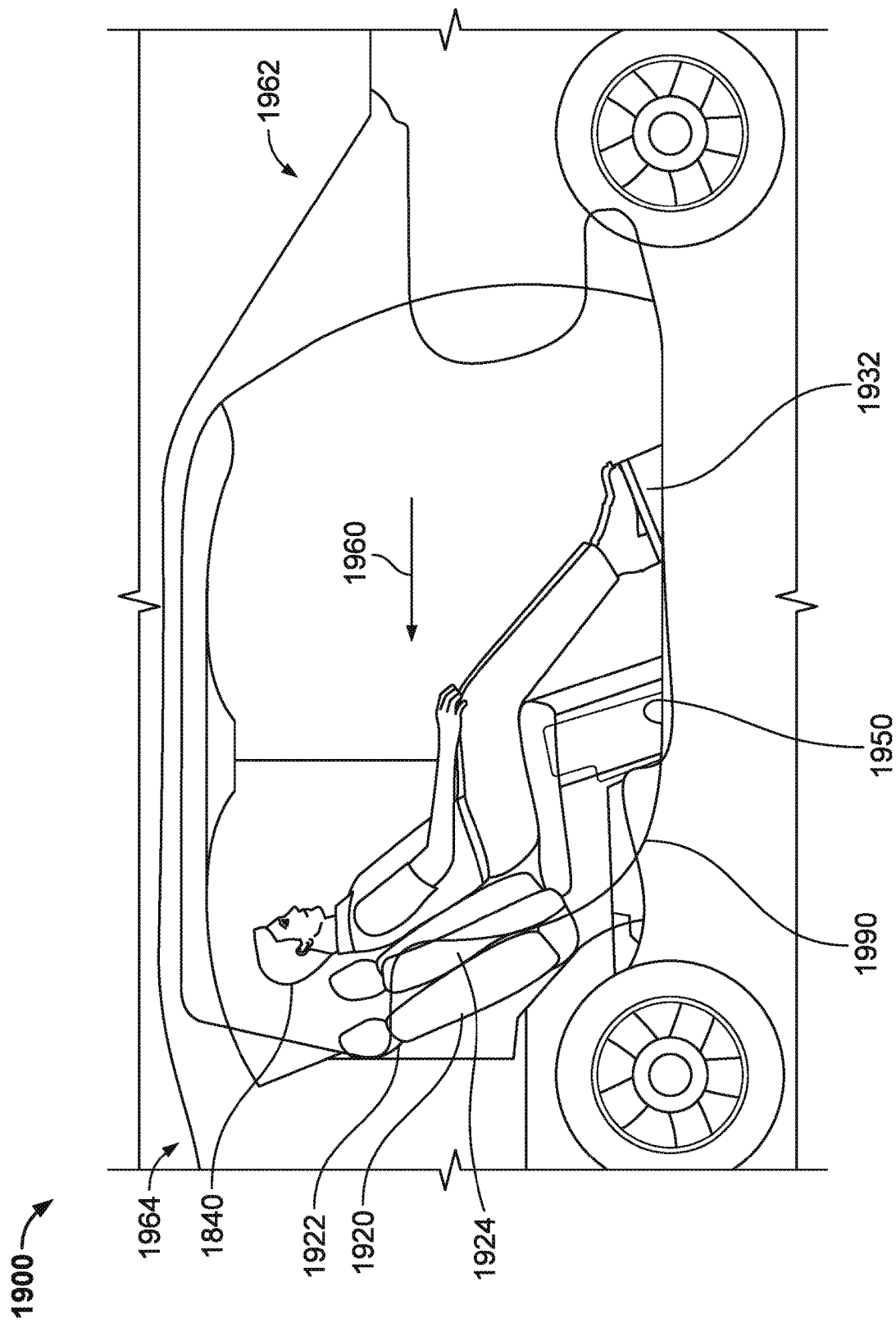

FIG. 19 is another view depicting the interior of a vehicle. In this example, the vehicle 1900 includes two rows of seating 1910, 1920. First row 1910 may include a pair of seats or bench seat having a first, two-row passenger use configuration (for a view of this configuration, see the example of FIG. 18A) to allow passengers, including passenger 1840 who may be the priority passenger, to sit and ride in the first row, as well as another passenger to sit and ride in the second row 1820.

FIG. 19 depicts first row 1910 in a second, additional legroom configuration having only a single row for passengers. In this example, rather than folding the first row to achieve the second configuration, second row is folded, and thereafter the first row is "stacked" onto the second row by moving the first row back over the folded second row. In other words, the base cushion 1922 (or cushions if there are two separate seats in the second row 1920) of second row 1920 are folded towards the portion 1922 of second row 1920 for supporting a passenger's back. In this example, unlike the example of FIG. 18B, the base cushion 1924 of the second row need not be lowered towards the floor 1990.

Thereafter, the first row 1910 is slid along a set of tracks 1950 in the direction of arrow 1960 towards the rear end 1964 of vehicle 1900 (1962 indicates the direction of the front end of the vehicle). In this example, the first row 1910 remains the priority row (as the priority passenger 1940 is still in the first row 1910), and the second row is no longer usable for passengers. Foot rest 1932 may pop up from the floor only when the front row 1910 is in the second, additional legroom configuration. For safety, the first row may be secured in place when in the second, additional legroom configuration as shown in FIG. 19.

FIGS. 20A-B are views depicting the interior of a vehicle. In this example, the vehicle 2000 includes a first side having two rows of seating 2010, 2020. A second side of the vehicle includes only a single row 2030 of seating. In this example, each row includes a single passenger seat, any of which could be for the priority passenger depending upon the configuration of the rows as discussed below. Together, these rows (or seats) form a "triangle" within the vehicle.

In this example, row 2030 can be moved along track 2050 in order to change the interior configuration of the vehicle, for instance to accommodate packages or luggage 2040. Row 2030 can therefore be moved to a position in line with seats of row 2010, in line with seats of row 2020, or various other positions between these positions as shown in FIG. 20. Changing configurations by moving the row 2030's position relative to rows 2010 and 2020 may allow the passengers different social experiences and or types of interactions.

Figures 20E, 20F:
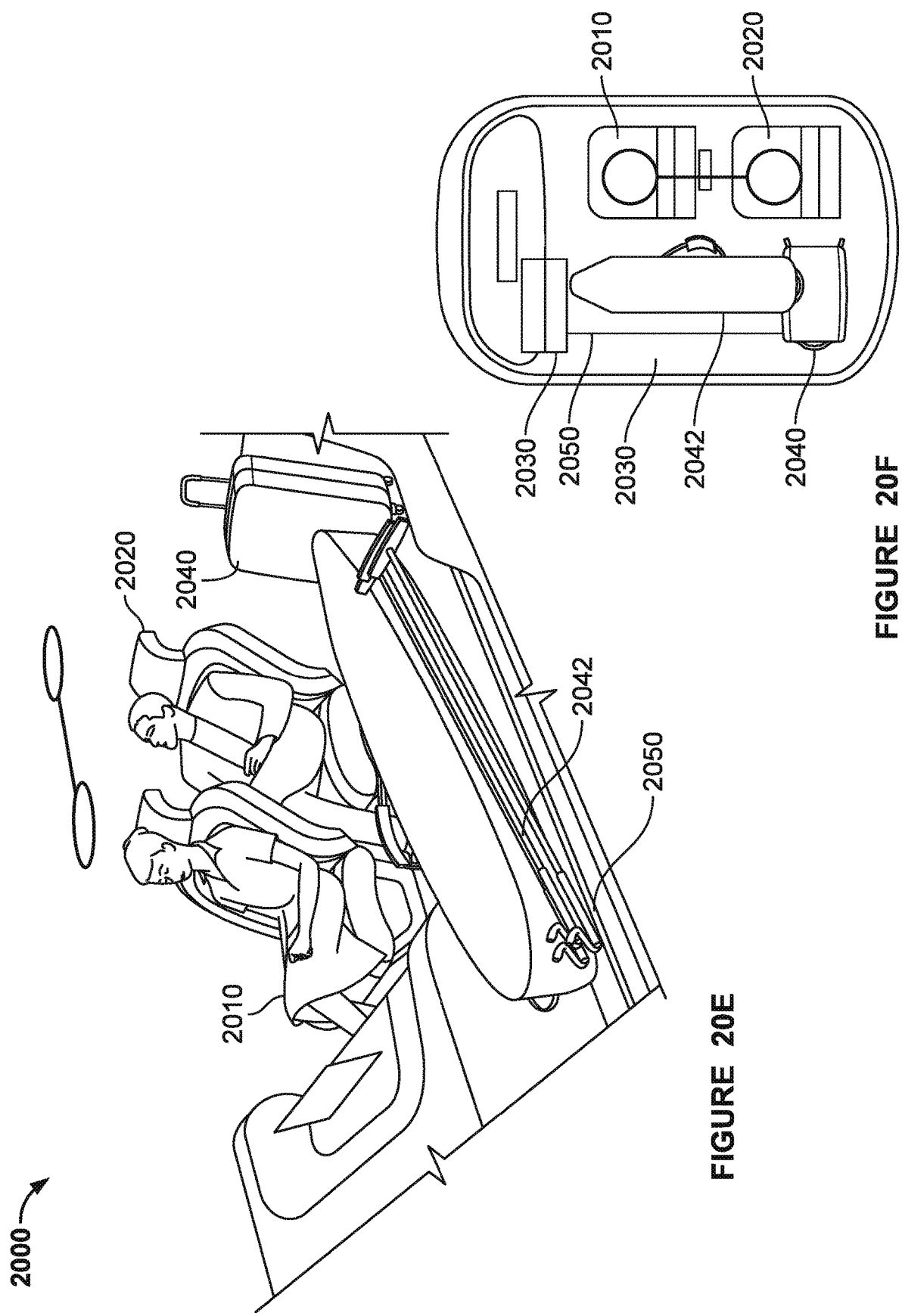

The features of FIGS. 20A-B may be combined with any of the folding concepts described above. For example, FIGS. 20C-D depict views of vehicle 2000 where row 2030 is in a first, passenger use configuration (FIG. 20C) and where row 2030 is in a second, folded configuration (FIG. 20D). In this example, to move from the first configuration to the second configuration, any of the examples of FIGS. 15-17F may be used. The row 2030 is then moved towards the front end 2060 of the vehicle and into a first recess 2082 in the dashboard 2080. When the row 2030 is "stored" in this configuration, the area adjacent to both rows 2010 and 2020 is open for larger items as shown in FIGS. 20E-F.

Returning to FIGS. 20C and 20D, as can be seen, dashboard 2080 also includes a second recess 2084 which allows the first row 2010 to also be folded and stored as row 2030 is shown in FIG. 20D. Thus, when there is only a single passenger in row 2020 and both first row 2010 and row 2030 are stored as discussed above, that passenger has a tremendous amount of legroom and room for additional luggage 2042 etc.

Console

Figure 21:
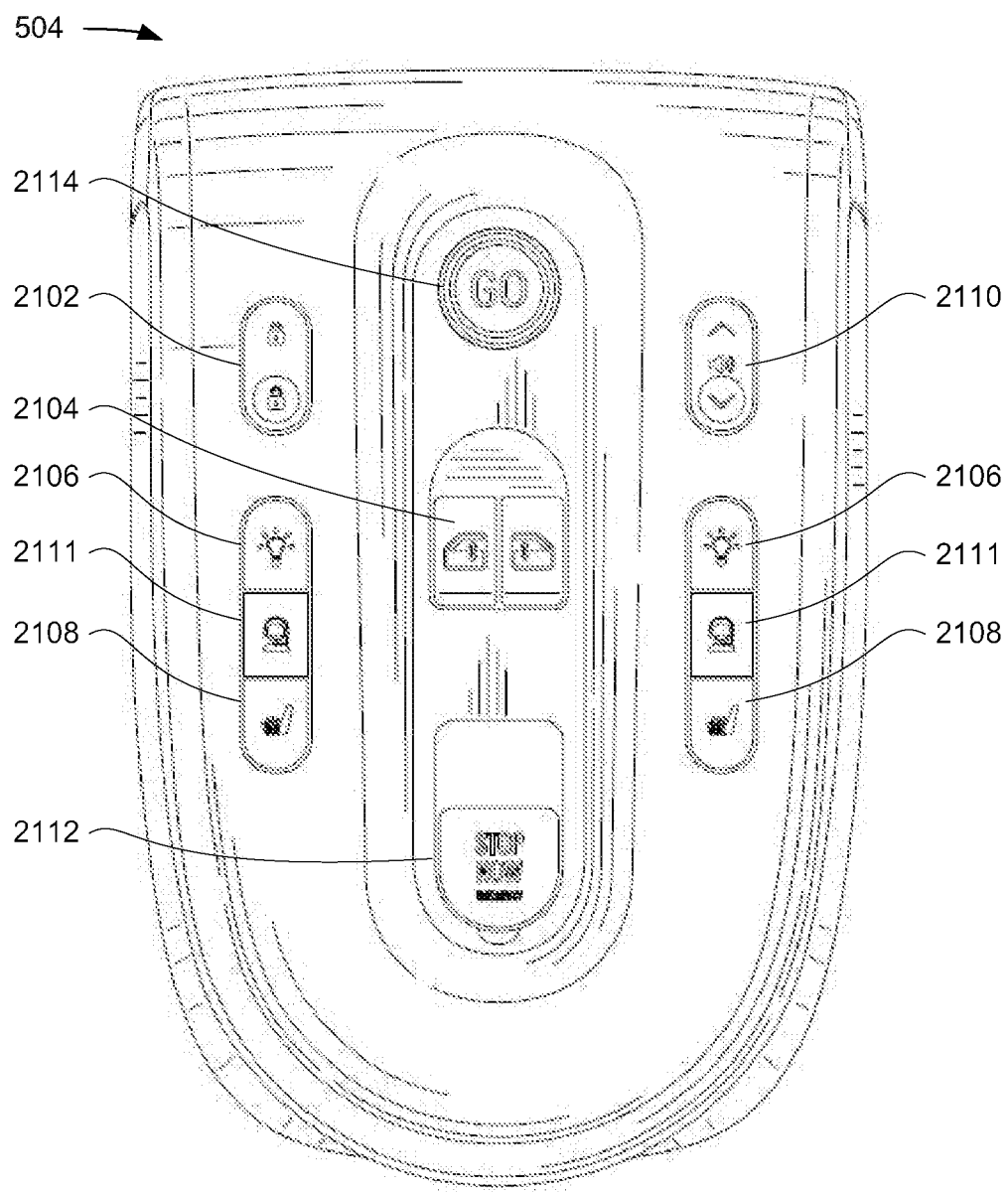
FIG. 21 is an example of a console of a vehicle in accordance with aspects of the disclosure.

In order for a user to provide input to the vehicle, as noted above, the vehicle may include a console arranged for use by the priority passenger. FIG. 21 is a top down view of the console 504 of FIG. 5. Console 504 includes various buttons for controlling features of a vehicle. For example, console 504 includes buttons that may be found in a typical vehicle such as buttons 2102 for locking and unlocking the doors 406, buttons 2104 for raising or lowering the windows of doors 406, buttons 2106 for turning on internal lights of the vehicle, buttons 2109 for controlling a heating function of seats 502, as well as buttons 2110 for controlling the volume of speakers 154. Although not shown, console 504 may also include one or more electronic displays for displaying information about the status of the vehicle.

In addition, console 504 also includes buttons 2111 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 2112 and 2114 may also be a part of user input 150 and in this regard, allow a passenger to communicate with computing device 110, for example, to initiate or end a trip in the vehicle. In this regard, button 2112 may act as an emergency stopping button that, when pushed, causes vehicle 100 to stop in a short amount of time. Because the passenger does not have direct control of the acceleration or deceleration of vehicle 100 by way of a gas or brake pedal, button 2112 may be an emergency stop button that is critical to allowing a passenger to feel safe and act quickly in case of an immediate emergency. In addition, because of the potentially abrupt nature of a stop initiated by the emergency stopping button 2112, the emergency stopping button 2112 may feature a cover (e.g., a clear plastic cover) that may have to be removed or flipped up in order to activate button 2112.

Button 2114 may be a multi-function button having different states. In the first state, button 2114 may be a "GO" button which a passenger uses to initiate a trip to a destination. Once vehicle 100 is moving, button 2114 may change to a "PULL OVER" button which a passenger uses to initiate a non-emergency stop. In this regard, computing device 110 may respond by determining a safe place to pull the vehicle over, rather than coming to a more sudden stop as with the emergency stop button 2112. Alternatively, two buttons, one having a "GO" state and the other having a "PULL OVER" state may be used.

Thus, passenger communication with computing device 110 for navigation purposes may be limited to button 2114 (or two buttons as in the example above), emergency stopping button 2112, wireless network connection 156 (such as Bluetooth LE) with the passenger's client computing device, and by sending information from the passenger's client computing device to the server 210 which then relays that information to the vehicle's computing device. In some examples, a passenger may provide information to the vehicle's computing device 110 via voice commands though the microphone as discussed above. In addition, however, the passenger may communicate with the concierge via a phone call, an application on the passenger's client computing device, a microphone, and/or the concierge button 2111 and in turn, the concierge may provide instructions control certain aspects of a vehicle via a concierge work station.

In many of the examples described above, the configuration of the rows of the vehicle may be changed. By doing so, the position of the passengers may also change, including the priority passenger who may need access to the console. Because of this, when the seating configurations are changed, the console may also be moved within the vehicle. For instance, the console may be incorporated into a housing. This housing may be movable within the interior of the car. For instance, the housing may be moved towards a front end or a rear end of the vehicle depending upon the location of the priority row, or rather the row having the priority passenger, is expected to be located. In this regard, once the rows of seats have been configured, the console may also be moved within the vehicle corresponding to the current configuration of the rows and placement of the priority passenger.

Figure 22B:
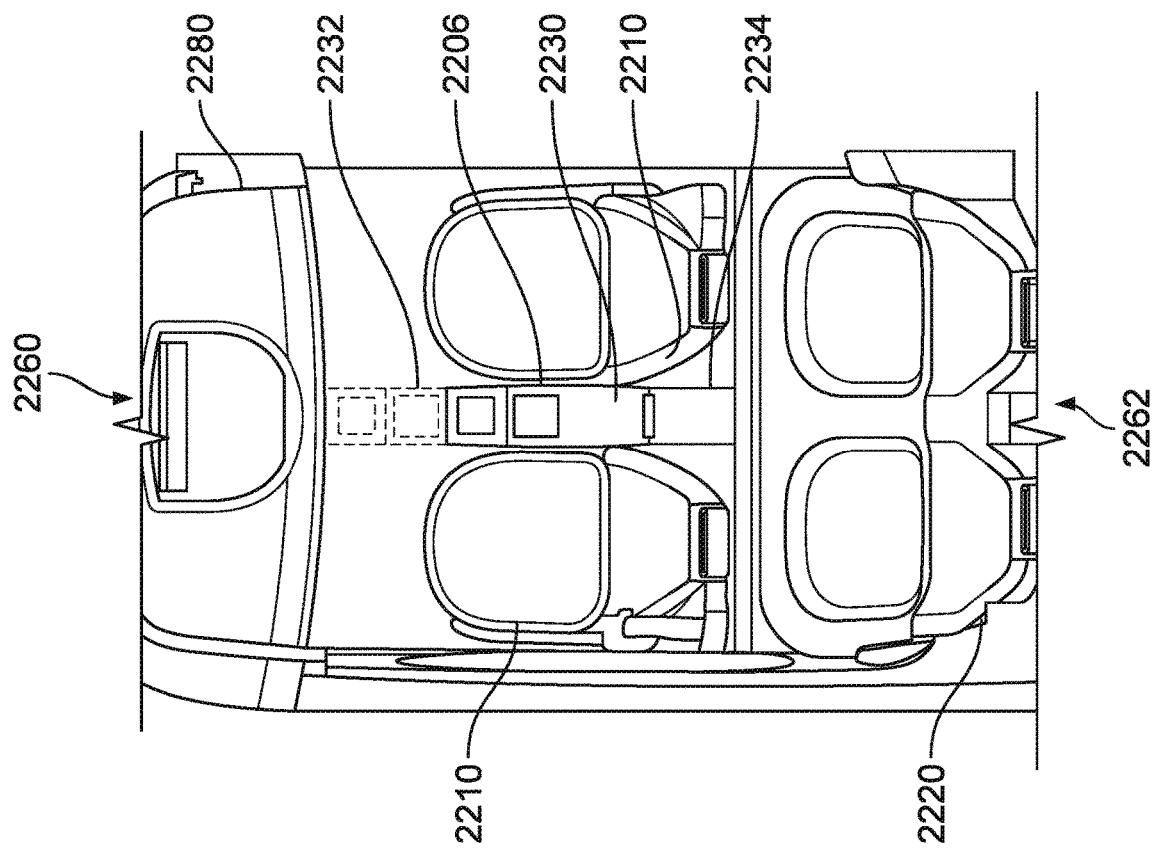
FIG. 22A-22D are example interview views of a vehicle in accordance with aspects of the disclosure.
Figure 22A:
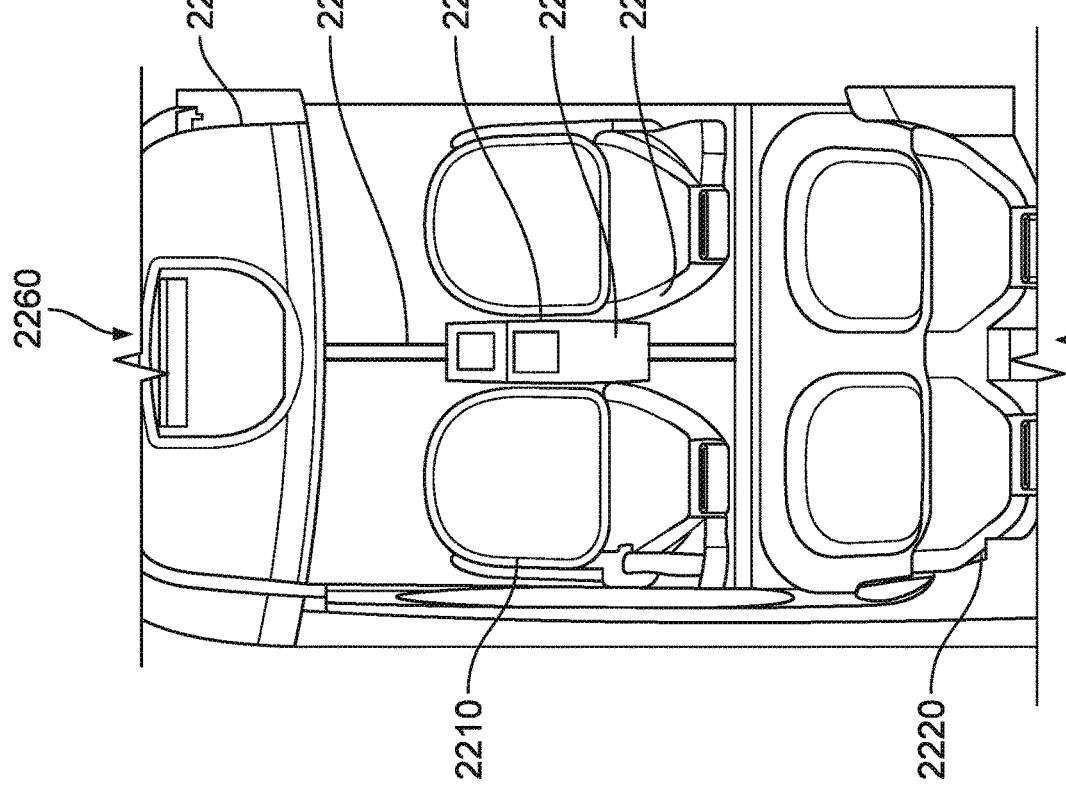

As an example, FIGS. 22A-22B are top down views depicting the interior of a vehicle 2200. FIG. 22A depicts a console 2204 and console housing 2206 in a first position 2230 between a first row of seats 2210. Console 2204 may be configured the same as or similarly to console 504. The vehicle also includes a second row of seats 2220. In this example, first row 2210 is the priority row, so the console housing 2206 is located such that a passenger in the seats of row 2210 may reach the console and use the various user inputs.

As noted above, the console housing 2206 may be moved. This movement may be achieved, for example, by sliding the console housing 2206 along a set of tracks 2250 as in the seat examples above. The tracks allow the console housing 2206 to move towards and away from the front end 2260 of the vehicle or rear 2262 of the vehicle.

Figure 22D:
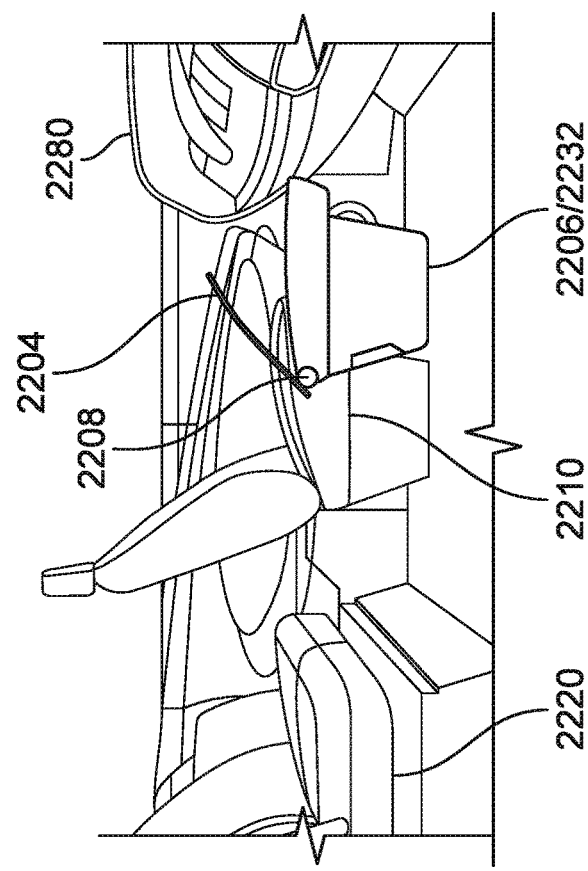

FIG. 22B depicts console housing 2206 in three different positions at the same time: the first position 2230 (also shown in FIG. 22A), a second position 2232 (also shown in FIG. 22D), and a third position 2234. In the second position 2230, the console housing 2206 is moved from the first position towards the front end of the vehicle. FIG. 22D depicts a side view of the console in the second position 2232. In this view, the console housing is as far forward towards the dashboard 2280 as the tracks will allow. Such a position can be convenient and more comfortable for a passenger in the first row 2210 who may have long arms. In addition, where the console 2204 is mounted to the console housing 2206 using a hinge 2208 as shown in FIG. 22D, the console 2204 can be tilted up, allowing a passenger in the row 2220 to view any information displayed at the console 2204.

In the third position 2234, the console housing 2206 is moved from the first position towards the rear 2262 of the vehicle. In this third position, the console housing is as far back away from the dashboard 2280 as the tracks will allow. Such a position can be more comfortable, convenient, and safe in situations where the first row of seats is folded (for instance, in any of the second, folded configurations described above). In that regard, where row 2220 becomes the priority row, a priority passenger in the row 2220 can still access the inputs of the console 2204 in order to control the vehicle as described above. Moving the console may also be useful in the case where the first row is stacked over the second row of seats (as in the examples of FIGS. 18A-19 above), but remains the priority row. The console housing may thus be moved to an appropriate position once the rows of seats of the vehicle are in a seating configuration appropriate for the number of passengers.

Figure 22C:
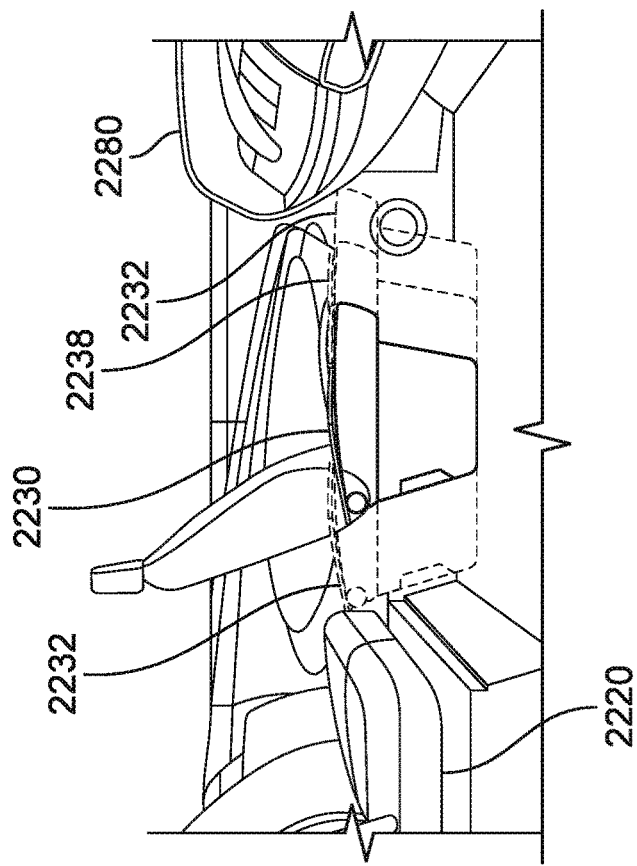

In addition to the first, second, and third positions described above, various intermediate positions along the tracks 2250 may also be used. For example, FIG. 22C depicts a fourth position 2238 of the console housing 2206 between the first and second positions. Although not shown, various other positions may also be achieved. Of course, for safety, the console housing may be secured when in any of the aforementioned positions.

Partition

Although vehicles such as vehicle 101 may be fully capable of full-time autonomous driving, manual controls (steering, braking, acceleration, signaling, etc.) are often legally required to exist in vehicles such as vehicle 101. Such controls are especially important to allow a designated test passenger to take control of the vehicle in an emergency situation. As an example, a test passenger may be a human operator or "test driver" tasked with testing the vehicle by sitting in the vehicle and observing the vehicle's actions when the vehicle is operating autonomously. However, in many situations, having manual controls when the vehicle does not include a designated a test passenger, may introduce a safety risk to passengers and bystanders should a passenger interfere with the manual controls. In order to address these risks, it may be appropriate to include a partition. This may reduce the likelihood of a passenger interfering with the manual controls.

Figures 23A, 23B, 23C:
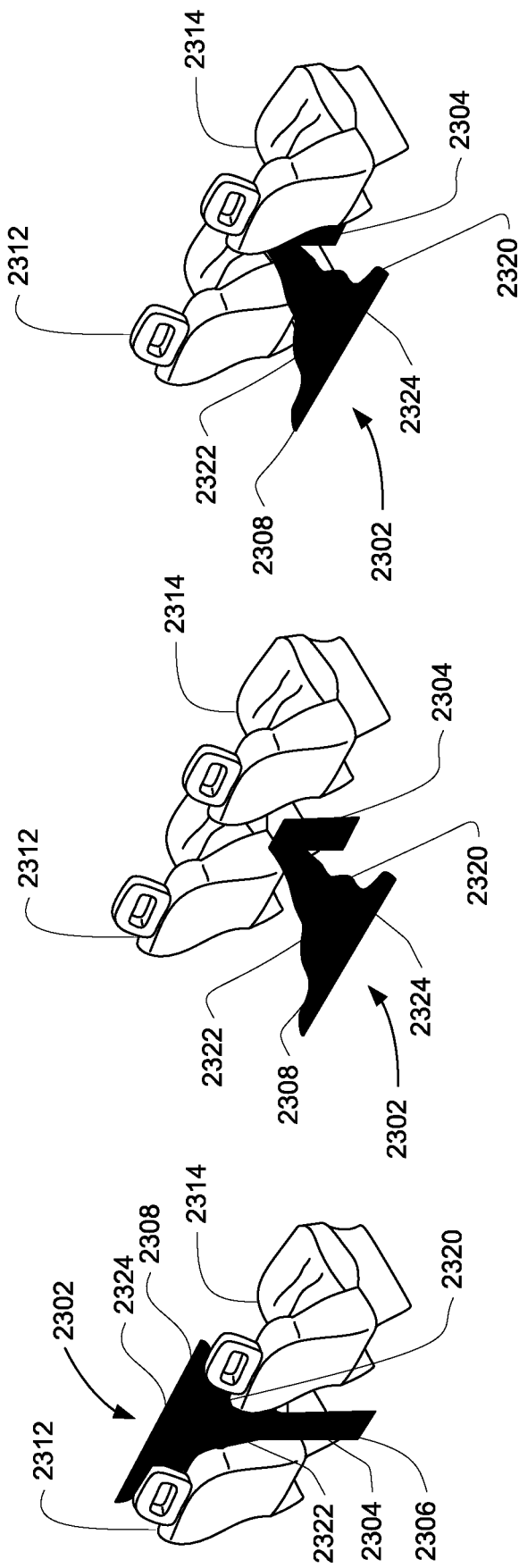
FIGS. 23A-23C are examples of seats and a partition in accordance with aspects of the disclosure.

The partition may be a fixed within the vehicle or be movable. As an example, FIGS. 23A-C depict a single row of seats 2312, 2314 in a vehicle, such as vehicle 100, with partitions 2302 in various configurations. Seats 2312, 2314 may form a first row of seats in the vehicle. In each example, a base portion 2304 of a partition 2302 is attached to a floor 2390 of the vehicle. As noted above, the partition may be completely fixed (non-movable) within the vehicle. Alternatively, the position of the base portion 2304 relative to the vehicle as well as the seats 2312, 2314 can be adjusted, for instance, by sliding the partition along a set of tracks, such as any of the sets of tracks described above.

In addition or alternatively to moving the partition along a set of tracks, a top portion of the partition may pivot as shown in FIGS. 23A-C. A second, top portion 2308 of the portion is attached to the base portion 2304 by a hinge 2306. The hinge allows the top portion 2308 to pivot about the base portion 2304 in order to arrange the partition into different configurations as shown in FIGS. 23A-23C.

FIG. 23A depicts the partition 2302 in a first, fully upright or active configuration. In this example, the partition forms a barrier between the seats 2312, 2314 of the first row. Here, seats 2312, 2314 may be as far forward in the vehicle as possible and the top portion 2308 is in line with the base portion 2304 of the partition 2302. Although not shown, the seats may also be folded using any of the examples described above. The top portion 2308 may include outer edges 2320, 2322 that generally follow the contours of the seats 2312, 2314. Of course, the partition may have an even larger shape and different outer edges based upon the folded configuration of the seats. In this regard, the outer edges of the partition may generally follow the contours of the seats when in a folded configuration.

The first configuration depicted in FIG. 23A may be most useful when there are passengers in the vehicle, with or without a test passenger. For instance, FIG. 23A depicts the configuration if the partition were fully fixed, partially movable (for instance on rails but cannot pivot), or movable (on rails) and capable of pivoting. This configuration may prevent or reduce the ability of any passengers in a second row of seats in the vehicle (not shown) located behind the first row from reaching the manual controls (not shown). If there is no test passenger or the first row is otherwise not needed for passengers, the partition and the seats of the first row may be moved as close to the dashboard as possible to give any passengers in the greatest amount of legroom and comfort.

FIG. 23B depicts the partition 2302 in a second, transition configuration, or rather a transition point between the configurations of FIGS. 23A and 23C. In this example, from FIG. 23A, the top portion 2308 is pivoted at the hinge 2306 approximately 90 degrees about the base portion 2304 and away from the seats 2312, 2314 of the first row. Although not shown, the top edge 2324 of the top portion 2308 may be resting on the second row of seats. To return the partition 2302 to the first configuration, the partition may be pivoted at the hinge 2306 about the base portion 2304 approximately 90 degrees towards the first row or front end of the vehicle.

FIG. 23C depicts the partition 2304 in a third, fully folded configuration. This configuration is similar to the configuration of 23B, but in this example, the seats 2310, 2312 are moved back towards the partition, for instance by sliding the seats on the set of tracks as noted above. Again the shape of the outer edges of 2320, 2322 that generally follow the contours of the seats when in the first configuration allows the seats to be moved towards the base portion 2304 as can be seen between FIGS. 23B and 23C. This configuration 23A may be most useful when there is a test passenger in the vehicle, but no other passengers in the second row (not shown).

The partition may be locked into the first or third configurations manually or automatically by the computing device 110 based on whether the vehicle is going to be used for testing and whether the first row is going to be occupied by passengers.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

The user may then use his or her client computing device to access the application and request a vehicle for a trip. As an example, a user such as user 132 may use client computing device 330 to send a request to one or more server computing devices 110 for a vehicle. As part of this, the user may identify a pickup location, a destination location, and, in some cases, one or more intermediate stopping locations anywhere within a service area where a vehicle can stop. In addition, the user may identify a number of passengers for the trip, and in some case, a preferred seating arrangement for the identified number of passengers.

Once the user has selected one or more of a pickup and/or destination locations and has identified the number of passengers for the trip, the client computing device 420 may send this information to one or more server computing devices of the centralized dispatching system. In response, one or more server computing devices, such as server computing device 110, may select a vehicle, for instance based on availability, current seating configuration of the vehicle given the identified number of passengers, and proximity to the user. The server computing device may then dispatch the selected vehicle to pick up to the user by providing the vehicle with the pickup and/or destination locations specified by the user.

In addition, the one or more server computing devices may send the vehicle's computing device 110 the identified number of passengers. In response, the vehicle may automatically reconfigure any rows of seating in the vehicle to best accommodate the identified number of passengers. For instance, this may be achieved by automatically folding seats or rows, moving seats or rows on tracks, stacking seats or rows, and moving a console to an appropriate position using any of the examples discussed above. Similarly, if the user has specified a preferred seating arrangement for the identified number of passengers, the vehicle may reconfigure the seats or rows according to the preferred seating arrangement, again using the examples provided above. In addition, or alternatively, when necessary, the vehicle's computing device 110 may cause the partition to move in to different configurations.

Alternatively, the user, upon entering the vehicle, may make changes to the seating configuration manually or by selecting an option (button) within the vehicle to do so.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a first row of seating for a vehicle, the first row of seating having a passenger use configuration where the first row of seating allows a passenger to sit in a seat of the first row of seating and access user input controls for the vehicle;
   a second row of seating for the vehicle having a passenger use configuration and second configuration, wherein when the second row of seating is in the second configuration, the first row of seating is configured to be moved over the second row of seating in order to increase the distance between a dashboard of the vehicle and the first row of seating.

2. The system of claim 1, further comprising a set of tracks on which the first row of seating can be moved towards a rear of the vehicle in order to move the first row of seating over the second row of seating.

3. The system of claim 1, wherein the second row of seating is configured to be moved downward towards a floor of the vehicle in order to enable the first row of seating to be moved over the second row of seating.

4. The system of claim 3, wherein the second row of seating is configured to be moved downward such that a height of a base cushion of the second row of seating is decreased relative to the floor of the vehicle.

5. The system of claim 3, wherein the second row of seating includes a collapsible base that allows the second row of seating to be moved downward.

6. The system of claim 5, wherein the collapsible base includes a base support configured to be folded in order to allow the second row of seating to be moved downward.

7. The system of claim 5, wherein the second row of seating includes two side supports configured such that when the base support is folded, the two side supports remain stationary.

8. The system of claim 7, wherein the second row of seating is configured such that a portion of a seat of the second row of seating is arranged between the side supports when the base support is folded.

9. The system of claim 1, wherein in the first row of seating is a bench seat.

10. The system of claim 1, wherein the first row of seating is a pair of seats.

11. The system of claim 1, further comprising a footrest configured to move up from a floor of the vehicle, when the first row of seating is arranged over at least a portion of the second row of seating.

12. The system of claim 1, further comprising the vehicle.

13. A method of arranging rows of seating in a vehicle having a first row of seating and a second row of seating, the first row of seating having a passenger use configuration where the first row allows a passenger to sit in a seat of the first row of seating and access user input controls for the vehicle, the method comprising:

changing the second row of seating from a passenger use configuration to a folded configuration; and moving the first row of seating at least partially over the second row of seating in order to in order to increase the distance between a dashboard of the vehicle and the first row of seating as compared to when the second row of seating is in a passenger use configuration.

14. The method of claim 13, wherein moving the first row of seating includes using a set of tracks to move the first row of seating towards a rear of the vehicle in order to move the first row of seating at least partially over the second row of seating.

15. The method of claim 13, further comprising, moving the second row of seating downward towards a floor of the vehicle in order to enable the first row of seating to be moved over the second row of seating.

16. The method of claim 15, wherein moving the second row of seating downward includes moving the second row of seating such that a height of a base cushion of the second row of seating is decreased relative to the floor of the vehicle.

17. The method of claim 15, wherein the second row of seating includes a collapsible base, wherein moving the second row of seating downwards includes folding a base support of the collapsible base.

18. The method of claim 17, wherein the collapsible base includes two side supports configured such that when the base support is folded, the two side supports remain stationary.

19. The method of claim system of claim 18, wherein moving the second row of seating downwards includes moving a portion of a seat of the second row of seating between the side supports.

20. The method of claim 13, wherein moving the first row of seating is performed automatically in response to receiving information identifying a number of passengers for the vehicle from a remote server computing device.

* * * * *

UNITED STATES PATENT AND TRADEMARK OFFICE
CERTIFICATE OF CORRECTION

| | |
|---|---|
| PATENT NO. | : 11,021,082 B2 |
| APPLICATION NO. | : 16/538176 |
| DATED | : June 1, 2021 |
| INVENTOR(S) | : YooJung Ahn et al. |

Page 1 of 1

It is certified that error appears in the above-identified patent and that said Letters Patent is hereby corrected as shown below:

In the Claims

Column 22, Claim 1, Line 62:
Delete "the distance"; and insert -- a distance --

Column 23, Claim 7, Line 15:
Delete "The system of caim 5,"; and insert -- The system of claim 6 --

Column 24, Claim 13, Line 5:
Delete "the distance"; and insert -- a distance --

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*